United States Patent
Chang et al.

(10) Patent No.: US 10,909,111 B2
(45) Date of Patent: Feb. 2, 2021

(54) NATURAL LANGUAGE EMBELLISHMENT GENERATION AND SUMMARIZATION FOR QUESTION-ANSWERING SYSTEMS

(71) Applicant: ADOBE INC., San Jose, CA (US)

(72) Inventors: Walter W. Chang, San Jose, CA (US); Elahe Rahimtoroghi, Santa Cruz, CA (US)

(73) Assignee: ADOBE INC., San Jose, CA (US)

( * ) Notice: Subject to any disclaimer, the term of this patent is extended or adjusted under 35 U.S.C. 154(b) by 456 days.

(21) Appl. No.: 14/971,180

(22) Filed: Dec. 16, 2015

(65) Prior Publication Data

US 2017/0177660 A1 Jun. 22, 2017

(51) Int. Cl.
*G06F 16/00* (2019.01)
*G06F 16/242* (2019.01)

(52) U.S. Cl.
CPC ................ *G06F 16/2425* (2019.01)

(58) Field of Classification Search
CPC ...... G06F 17/20; G06F 17/28; G06F 17/2881; G06F 17/30401; G06F 17/27; G06F 17/3043; G06F 17/30654; G06F 17/30663; G06F 17/30684; G06F 17/30976; G06F 17/30395; G06F 16/3334; G06F 16/3344; G06F 16/3349; G06F 16/2425
USPC ........ 707/748, 735, 739, 753, 759, 765, 771
See application file for complete search history.

(56) References Cited

U.S. PATENT DOCUMENTS 9,501,585 B1 * 11/2016 Gautam ............ G06F 17/30572
9,576,009 B1 * 2/2017 Hammond ........ G06F 17/30321
2006/0085387 A1 * 4/2006 Aggarwal ............... G06F 16/00
2010/0114944 A1 * 5/2010 Adler .................... G10L 13/027
707/770
2011/0252031 A1 * 10/2011 Blumenthal ........... G06Q 30/02
707/733

(Continued)

OTHER PUBLICATIONS

Belz, A. (2008). Automatic generation of weather forecast texts using comprehensive probabilistic generation-space models. Natural Language Engineering, 14(4), 431-455.

(Continued)

*Primary Examiner* — Mohammed R Uddin
(74) *Attorney, Agent, or Firm* — Shook, Hardy & Bacon L.L.P.

(57) ABSTRACT

Systems and methods are disclosed for augmenting or summarizing an information processing task in a bilateral Q&A format. An initial query is received from an analyst user to conduct an analysis on user-provided data attributes. A primary result is generated from processing the initial query. In addition, defined data attributes associated with the primary result are ranked to create relevant follow-up queries. A summary of the primary result, using both graphical representations and natural language summaries, are provided to the analyst user. The relevant follow-up queries can also be provided to the analyst user, thereby progressing a contextually-based conversation regarding the data. The analytics session can progress as the user traverses the results and follow-up queries, until the user terminates the session or all relevant follow-up queries are exhausted. A concise narrative of the session with varying levels of detail specified by the user is presented in natural language to provide the analyst user with a relevant summary of the performed analysis.

20 Claims, 12 Drawing Sheets

(56) References Cited

U.S. PATENT DOCUMENTS

| | | | | |
|---|---|---|---|---|
| 2012/0102405 | A1* | 4/2012 | Zuckerman | G16H 50/20 715/733 |
| 2014/0101147 | A1* | 4/2014 | Foody | G06F 16/243 707/729 |
| 2017/0091312 | A1* | 3/2017 | Ajmera | G06F 17/30654 |

OTHER PUBLICATIONS

Channarukul, S. (2001). YAG: A Natural Language Generator for Real-Time Systems. Natural Language and Knowledge Representation Research Group. University of Wisconsion-Milwaukee. 4 pages.

Cheung, J. C. K., & Penn, G. (2014). Unsupervised sentence enhancement for automatic summarization. In Proceedings of the 2014 Conference on Empirical Methods in Natural Language Processing (EMNLP) (pp. 775-786).

Reiter, E. (Jun. 2007). An architecture for data-to-text systems. In Proceedings of the Eleventh European Workshop on Natural Language Generation (pp. 97-104). Association for Computational Linguistics.

* cited by examiner

Group #5:
['CA', 'TX', 'NY', 'FL', 'IL', 'PA', 'NJ', 'AZ', 'UT', 'LA', 'NM', 'HI', 'MS', 'AK', 'RI', 'WV', 'DE', 'PR', 'TN', 'NV']

Group #4:
['MD', 'IA', 'DC', 'AR', 'ID', 'NE', 'MT', 'SD', 'WY', 'WA', 'VA', 'GA', 'MA', 'MI', 'NC', 'CO', 'MN', 'MO', 'WI', 'CT', 'AL', 'SC', 'KS', 'KY', 'NH', 'ME', 'VT']

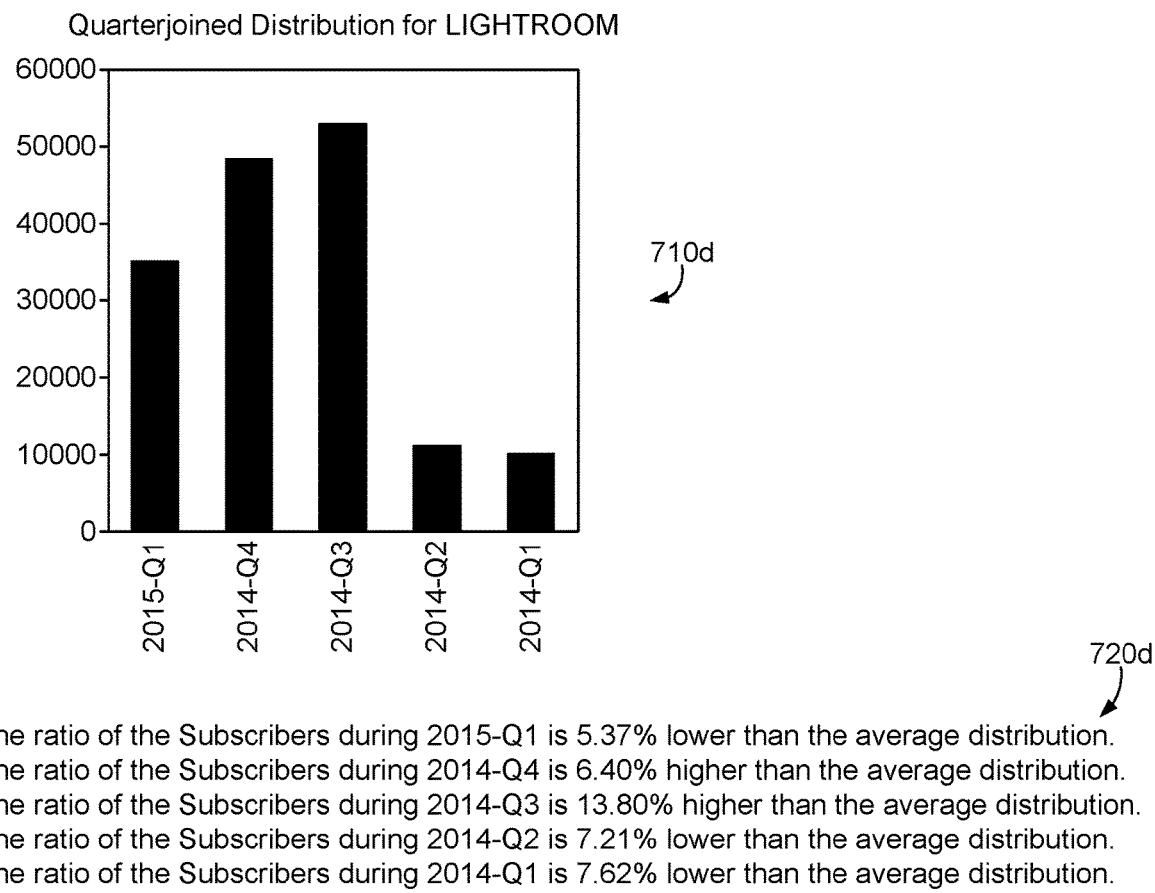

The ratio of the Subscribers during 2015-Q1 is 5.37% lower than the average distribution.
The ratio of the Subscribers during 2014-Q4 is 6.40% higher than the average distribution.
The ratio of the Subscribers during 2014-Q3 is 13.80% higher than the average distribution.
The ratio of the Subscribers during 2014-Q2 is 7.21% lower than the average distribution.
The ratio of the Subscribers during 2014-Q1 is 7.62% lower than the average distribution.

FIG. 7D

NATURAL LANGUAGE EMBELLISHMENT GENERATION AND SUMMARIZATION FOR QUESTION-ANSWERING SYSTEMS

BACKGROUND

Digital assistants are software-based agents that are configured to perform tasks or services for users based on information including user input, location awareness, and accessed information from external sources. Generally, digital assistants have the ability to communicate with users in natural language. Digital assistants have widespread applications, such as note taking, task management, contact management, web searching, checking weather, and the like. The utilization of digital assistants is becoming increasingly popular due to the time-savings realized from providing natural language inputs and receiving, nearly instantaneously, a natural language feedback response. While digital assistants have generally been developed for rather simple applications within the personal realm, the ability to harness this technology in more complex applications, such as those within in the business realm, would be very beneficial. More specifically, a digital assistant in the analytics domain can be useful for searching analytics data and further identifying trends in the data, without requiring the technical expertise that is generally necessary to conduct an insightful analysis.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments described herein are directed to interactively facilitating statistical analytics, and more generally, data storytelling. In essence, embodiments are broadly directed to receiving a query from a user and conducting various analyses on a set of data. After obtaining initial results of the user's query, embodiments run machine learning algorithms and statistical analysis to suggest the most relevant "dimensions" or data "attributes", interesting patterns, and/or insightful information. In addition, a natural language generation framework conversationally describes the results and findings for the user and generates relevant follow-up questions. Finally, after a number of interactions between the system and the user, a natural language narration is generated that summarizes the key takeaways of the findings through the data analysis process.

BRIEF DESCRIPTION OF THE DRAWINGS

The present invention is described in detail below with reference to the attached drawing figures, wherein:

FIGS. 7A-7D illustrate exemplary graphical representations generated by the statistical analytics application of FIG. 1, in accordance with some implementations of the present disclosure;

DETAILED DESCRIPTION

Figure 1:
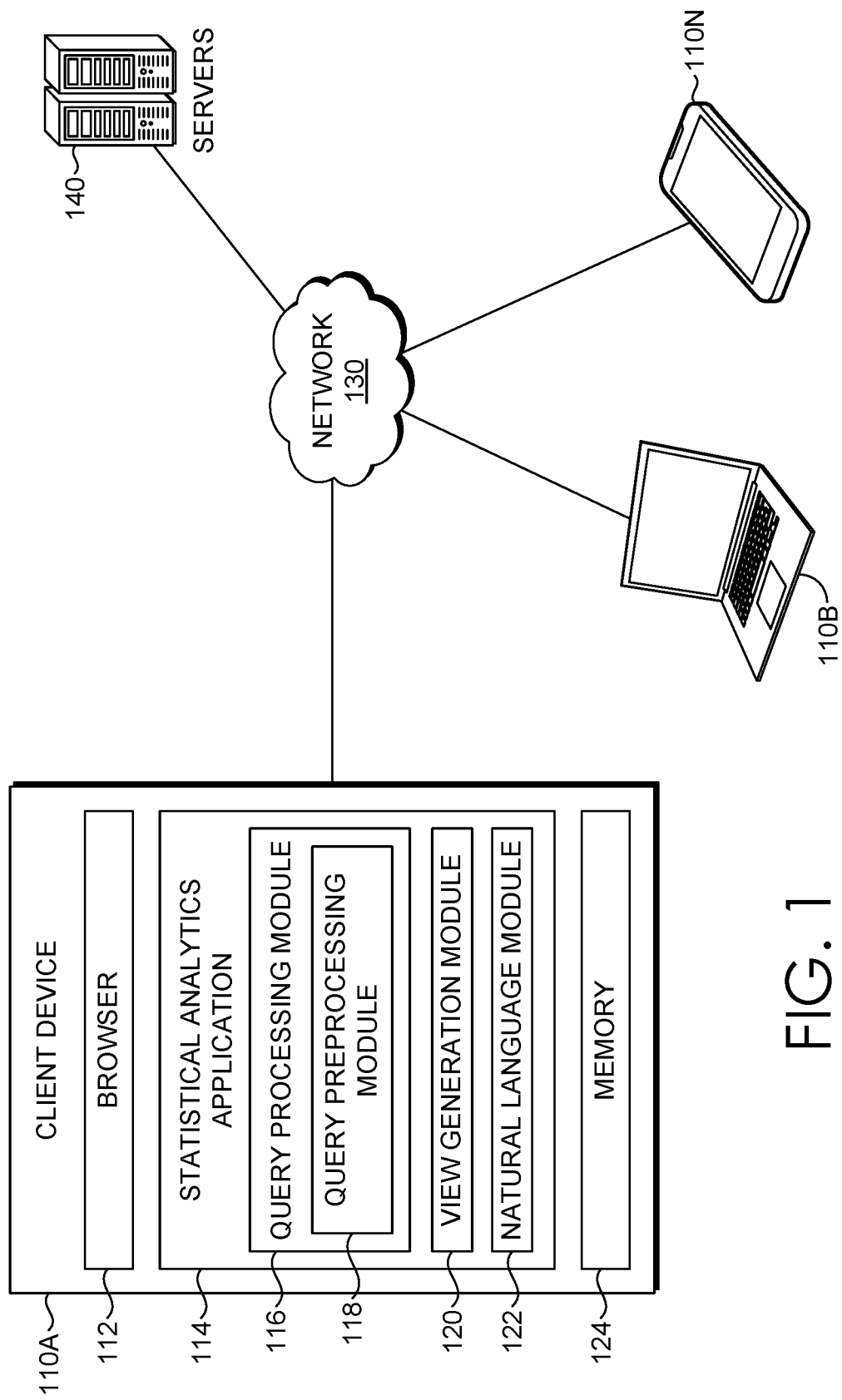
FIG. 1 is a diagram illustrating an exemplary statistical analytics system, in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Digital assistants are regularly used in personal assistant applications by receiving, for example, textual questions, simple audible instructions, or verbal queries from a user in natural language (i.e., plain English), and replying to the user (also in natural language) a result based on the received instructions or queries. Simple applications, such as contact managers (i.e., for telephone), task managers, web search engines, maps, and the like, can all include implementations of digital assistants as a user control interface. As the typical format for the conversation is a question and answer ("Q&A") format, which is by nature unidirectional, the user simply provides the query while the digital assistant provides the result. The simplicity of the unidirectional Q&A dialogue between the user and digital assistant is what has enabled developers to implement, in increasing popularity, a digital assistant control interface on their applications.

One reason as to why more complex applications, such as business-related applications, do not include digital assistant control interfaces, is due to the multi-faceted computations involved when performing complex tasks—i.e., workflows that may require multiple inputs by the user. In more detail, business applications oftentimes require a user to provide a selection of choices, or to guide the application down a path of a decision tree. In doing so, the application must be able to communicate the available paths to the user in the form of follow-up questions, while still guiding the conversation in natural language. To this end, the bidirectional Q&A conversation can grow more complex in conjunction with the complexity of the application. Moreover, in one regard, the complexity of understanding a user's natural language input, and in another regard, responding to the user employing natural language utterances, are both very difficult features to incorporate and implement properly.

Data analytics is one example of a business application that requires multiple inputs from a user, typically from a data analyst, and further requires multifaceted computations on behalf of the business application. Generally, a data analyst would employ a traditional data analytics application to explore a plurality of data points (herein also referred to as "the data"), compute a relevant analysis thereon, view graphical representations of the computations, and the like. Moreover, some modern data analytics applications have incorporated natural language engines for generating and providing automatic summaries of data related to critical business information, such as website traffic behavior. Nonetheless, the Q&A conversation between these data analytics applications remain unilateral, in that the user must provide the application with a specific query, so that the application can produce a desired result. Further, as data analysts are still required to have some technical expertise to identify relevant data "dimensions" (herein also referred to as data "attributes"), a Q&A conversation having some utility in guiding the analyst would be highly beneficial.

As will be referenced herein, a data attribute refers to a property of a data point, object, element, or file. In some embodiments, data attributes can be in the form of metadata. In other embodiments, data attributes can be in the form of data types associated with the data point, object, element, or file (e.g., the data definition associated with a column in a database, table, or spreadsheet). In embodiments, data attributes are generally pre-associated with the data (herein referred to as "defined data attributes"), such that a query for any one or more data attributes can reference data points having association with the one or more data attributes. In other words, all data points will have at least one pre-existing data attribute associated therewith. In some embodiments, data attributes can be communicated as a search parameter in the form of user input (herein referred to as "user-provided data attributes"). More specifically, a user can provide, as input, a reference (i.e., a search parameter) to one or more data attributes, or specific values for the one or more data attributes, that may or may not be associated with the data.

As such, embodiments described herein are directed to a digital assistant for facilitating data analytics in a bilateral Q&A format. As an initial matter, the digital assistant can facilitate data analytics in the bilateral Q&A format by incorporating statistical analyses with user preference(s), to rank defined data attributes that may be relevant to the user. In this regard, the digital assistant can provide the user with a rich set of insightful information based on an initial query, among other things. The information may include: natural language summaries that are, in essence, natural language narratives concisely summarizing results based on the initial query; follow-up questions (also in natural language narratives), which are ranked insights into defined data attributes that may be relevant to the user; and engaging summaries that include graphical representations and natural language narratives that summarize results associated with the bilateral Q&A conversation or selected portions thereof.

In accordance with some embodiments, a user provides an initial query for analysis on the data, whereby the initial query includes user-provided data attributes having relevance to the user. The initial query can be received, from the user, in natural language audibly or via some other input method. The initial query is then processed to generate a result. Processing the initial query includes analyzing the defined data attributes that correspond to the set of data points in accordance with the user-provided data attributes of the initial query. As will be referenced herein, a "result" is an analytical output that is generated in response to a query. A "primary result" is used herein with reference to an analytical output that is generated in response to an initial query. Further, a "secondary result" is used herein with reference to an analytical output that is generated in response to either a follow-up question that is selected in response to a previously-generated result, or a new user-provided query that is received in an event the user does not wish to select a follow-up question. Generally, reference to a "result" can refer to a primary result, a secondary result, or any combination thereof.

By way of example, the user may be interested in performing a custom analysis on the data, specifically focusing on a particular user-provided data attribute that may or may not be associated with the data. In this regard, the user can provide an initial query that references the particular user-provided data attribute for analysis. For instance, if a user wanted to perform a statistical analysis on the data, the user could initiate an analytics session by speaking an initial query. By way of a non-limiting example only, an initial query spoken by a user could sound like, "How many subscribers were added, group by state and product?" In this example, the user is interested in conducting an analysis on a portion of the data that has the defined data attribute "subscribers," and is requesting that the primary result be grouped by defined data attributes "state" and "product." If at least one user-provided attribute is not recognized or is not associated with the data, an error can be presented to the user, or the primary result can be generated without considering the at least one unrecognized or non-associated user-provided attribute.

Once the initial query is received, it is then processed by the digital assistant in accordance with embodiments described herein. "Processing" of the initial query, as will be referenced herein, includes analyzing the data and the associated defined data attributes to identify, among other things, a set of data points that correspond to the user-provided data attribute(s) and/or associated values received in the initial query. Processing the initial query can include a preprocessing step that modifies the data (e.g., the data points) based on user preferences found in the user's profile. In more detail, preprocessing can remove undesirable data points from the data, if the user's profile includes a user preference that indicates a disinterest in particular defined data attributes and/or values associated with particular defined data attributes. By way of a non-limiting example only, if the user's profile indicates that the user does not wish to consider data points that are related to "subscribers" residing in "state" Alaska, preprocessing can filter out a subset of data points that are associated with "subscribers" residing in Alaska, such that the subset of data points is removed from the data prior to conducting the bilateral Q&A analysis.

Processing the initial query to generate the primary result can further include the generation of a significant distribution (e.g., 75-80%) and a tail distribution (e.g., 20-25%) of the data corresponding with the initial query, generating different views of the data corresponding with the initial query, generating distribution and trend comparisons, and more, as will be described herein.

Generally, once an initial query is processed on data, oftentimes a large number of user-provided data attributes associated with the initial query, and/or defined data attributes associated with the corresponding results, are available for exploration by the user. As such, embodiments described herein rank the defined data attributes based on their relationship to the user's analytical goals. The user's analytical goals can be based on the initial query, the corresponding results, user preference information in the user's profile, or any combination thereof. By way of a non-limiting example only, if the user's initial query was "How many subscribers were added, group by state and product?", and if the user's preference information indicated that the user was not interested in any subscriber residing outside of North America, the user's analytical goals can be assumed to be directed to analyzing, among other things, North American subscribers, for identifying trends or comparisons corresponding to the subscribers' resident state or registered product(s). In this regard, ranking of the defined data attributes provides for an ordered set of relevant follow-up questions based on, among other things, the generated result. To this end, embodiments described herein provide the user with ranked defined data attributes that are the most important or most impactful to the user.

A natural language summary (herein also referred to as an "embellishment") of the primary result and a set of relevant follow-up questions based on the primary result are provided for output to the user. The output is provided, at least in part, to the user on a display as a visual representation and/or provided to the user in audible form as a natural language embellishment, as will be described herein in more detail. In some embodiments, the user can interactively delete one or more portions of the primary result so that they are not included in a generated summary of the analytics session, as will be described. For instance, if an embellishment of the primary result and/or the set of relevant follow-up questions are provided for display within a user interface to the user, the user interface may include input controls (e.g., buttons, flags, highlights, etc.) corresponding to portions of the primary result and/or any of the relevant follow-up questions, to interactively receive either positive or negative feedback from the user, indicating particular relevance to the user's analysis, or lack thereof. The received feedback can then be logged and utilized when generating the analytics session summary.

The Q&A conversation (also referred to herein as the "analytics session") is now bilateral in the sense that the user is provided with relevant follow-up questions to his/her initial question, and a two-way conversation can thus take place that is relevant to the aspects of data that are of particular relevance to the user. The Q&A conversation can continue, as the user provides an affirmative response (i.e., vocally or employing another input method such as text) to at least one of the follow-up questions. The selected follow-up question can then be processed to generate a secondary result, based on another analysis corresponding to the selected follow-up question. In other words, a selection of a follow-up question will initialize another analysis that is directed to the defined data attributes associated with the selected follow-up question. By way of a non-limiting example only, some exemplary ranked follow-up questions to the initial query of "How many subscribers were added, group by state and product?" can include: (1) By subscription type, how many new subscribers were added?; (2) By state and subscription type, how many new subscribers were added?; and (3) By market, how many new subscribers were added? In this regard, if the first follow-up question is selected for processing, a secondary analysis that focuses particularly on data having a defined data attribute "subscription date" after a particular date (e.g., within the past 30 days), grouped by the defined data attribute "subscription type", is conducted to generate a secondary result.

In some embodiments, the user can input a new query at any time during the Q&A conversation, in the event the provided follow-up questions are not particularly relevant to the user. To this end, the new, user-provided query can then be processed to generate the secondary result based on the analysis corresponding to the new user-provided query. Similarly, in some embodiments, the user can also interactively provide relevance feedback to one or more portions of the secondary result, so that such portions are either accentuated or not included in the analytics session summary, as was described herein above.

The bilateral Q&A conversation may, in some embodiments, reach a termination point. The termination point can initiated either at the will of the user or due to some other reason, such as an exhaustion of follow-up questions. At such a juncture, embodiments described herein generate and provide for output an analytics session summary (herein also referred to as a "final data story") that is based on each of the results that were provided for output to the user. As was described above, in some embodiments, the final data story is based on each of the results provided for output to the user. More particularly, the final data story can provide greater detail for portions of the results that were interactively marked for relevance to the user during the Q&A conversation, or omit portions of the results that were interactively marked for little relevance to the user during the Q&A conversation. In another embodiment, the final data story, or at least portions thereof, can be provided for output to the user in the form of verbose or terse summaries based on user preferences or interactive feedback provided by the user during the Q&A conversation. As will be described, the final data story can be generated in either graphical representations, natural language, or a combination thereof, to provide a natural language utterance of the data results associated with the Q&A conversation. Similarly, the final data story is provided for display or provided for textual and/or audible (i.e., audio playback) output to the user.

Turning now to FIG. 1, a diagram is provided illustrating an exemplary system in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 can be a client-only or a client-server system that can be utilized to interactively facilitate statistical analytics. Among other components not shown, the system 100 can include any number of client devices, such as client devices 110*a* and 110*b* through 110*n*, network 130, and one or more remote server devices 140. It should be understood that any number of servers and client devices may be employed within system 100 within the scope of the present disclosure. Each may comprise a single device or multiple devices cooperating in a distributed environment. Additionally, other components not shown may also be included within the distributed environment.

It should further be understood that system 100 shown in FIG. 1 is an example of one suitable computing system architecture. Each of the servers and client devices shown in FIG. 1 may be implemented via a computing device, such as computing device 1100, later described with reference to FIG. 11, for example. The components may communicate with each other via network 130.

Network 130 may be wired, wireless, or both. Network 130 may include multiple networks, or a network of networks, but is shown in simple form so as not to obscure aspects of the present disclosure. By way of example, network 130 can include one or more wide area networks (WANs), one or more local area networks (LANs), one or more public networks, such as the Internet, and/or one or more private networks. Where network 130 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 130 is not described in significant detail.

In various implementations, client devices 110a and 110b through 110n are computing devices that are capable of accessing the Internet, such as the World Wide Web. Client devices might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

Client devices 110a and 110b through 110n can include one or more processors, and one or more computer-readable media. The computer-readable media may include computer-readable instructions executable by the one or more processors. The instructions may correspond to one or more applications, such as browser 112, statistical analytics application 114, query processing module 116, query preprocessing module 118, view generation module 120, and/or natural language module 122, shown on client device 110a. The client devices 110a and 110b through 110n can be configured to store, among other things, raw data (e.g., a plurality of data points) for analysis by the statistical analytics application 114 in memory, such as memory 124. As will be described in more detail, the client devices 110a and 110b through 110n can also be configured to store user profile information for use by the statistical analytics application 114 in memory, such as memory 124. The memory 124 can comprise, for instance, one or more computer-readable media.

Browser 112, such as a web browser, can be an HTTP-compatible application (e.g. an Application that supports an HTTP or HTTPS protocol). A specific example of browser 112 is the Google® Chrome® web browser. Statistical analytics application 114 may be independently installed on the client device as a standalone application, or can be accessed through a web-based application hosted by server 140 or other server(s) (not shown) and accessible to client devices by the browser 112. In some instances, the statistical analytics application 114 can be accessible over the web (e.g., a dynamic web application or a cloud-based web application) through the browser 112. Accessing the dynamic web application 114 over the web can be accomplished on the client 110a by visiting a Uniform Resource Identifier (URI or URL) to receive code (e.g., HTML) for rendering, the code being dynamically generated by the server 140 and communicated to the client 110a over the network 130.

The statistical analytics application 114 can be configured to, among other things, receive an initial analytics-based query that is relevant to a plurality of data points, preprocess data based on the query, process the data based on the query, and generate graphical representation(s) of the preprocessing and/or processing results based on the queries. As will be described, the statistical analytics application 114 can include additional components, modules, subcomponents, and/or submodules, that can facilitate a bilateral Q&A conversation in natural language for contextually analyzing data based on the user's initial query.

The statistical analytics application 114 includes a query processing module 116 that, after receiving the user's initial query, processes a set of data points from the plurality of data points stored in memory 124, based on parameters of the received initial query, to generate at least a primary result. After receiving the user's initial query and the parameters associated therewith, as will be described, the query preprocessing module 118 preprocess the set of data points corresponding to the parameters of the received initial query, to generate a primary result. In more detail, preprocessing can remove a portion of data points from the plurality of data points that is not relevant or of particular interest to the user based on information stored in the user's profile information. For example, if a user is not interested in conducting, generally, an analysis that includes particular regions, time frames, products, or other characteristics associated with the data points, a portion of data points from the initially defined set of data points having such characteristics are removed from consideration during processing and analysis.

The user's profile information, which is stored in memory 124, can also provide the user's preferred definition of a top distribution (e.g., 75%, 80%, 85%, etc.). As such, the tail distribution would be the remaining percentage after having defined the top distribution. For instance, if the user's profile information defines a preferred top distribution to be 75%, then the tail distribution would be calculated as 25% (i.e., 100%–75%). To this end, preprocessing of the user's initial query can "clean up" the set of data points defined by the initial query to limit the scope of data points that are processed and analyzed to generate the primary result. In some embodiments, the query preprocessing module 118 can further employ the view generation module 120 to provide for display one or more graphical representations of the primary result using the "cleaned up" set of data points, and/or further employ the natural language module 122 to provide for audible output an audible embellishment of the primary result using the "cleaned up" set of data points, as will be described.

After the set of data points is preprocessed by query preprocessing module 118, the query processing module 116 processes the set of data points from the plurality of data points stored in memory 124. As will be described with further reference to FIG. 2, the query processing module 116 analyzes a large number of data attributes associated with the preprocessed set of data points to facilitate a contextually-guided Q&A conversation with the user, based on at least the generated primary result. As will be described, the generated primary result is based on parameters (e.g., user-provided data attributes or inquiry-related keywords) defined by the initial query, and as such, the query processing module 116 can be configured to employ at least some of these parameters to rank defined data attributes associated with the set of data points. In more detail, ranking defined data attributes associated with the set of data points can provide, in order of statistically-based or preference-based significance, defined data attributes that may be of relevance to the user based on the initial query. In this regard, follow-up questions directed to these ranked defined data attributes can be provided to the user to facilitate a more detailed analysis.

As will also be described, the query processing module 116 can be configured to compare two or more distributions associated with the set of data points to identify statistical similarities and differences therebetween. Moreover, the query processing module 116 can be configured to provide insight into trends that are detected in the set of data points. As in preprocessing, the query processing module 116 can employ the view generation module 120 to provide for display, graphical representations of the various distributions, trends, comparisons, and/or subsets of data points based on user inputs, as will be described. The query processing module 116 can further employ the natural language module 122 to provide for output (which may be audible) an embellishment of the distributions, trends, comparisons, or any combination thereof, as will also be described.

In some embodiments, the statistical analytics application can include a natural language module 122 that is configured to receive inputs from a user (which may be audible, i.e., spoken or textual), and comprehend the received inputs to perform actions in response thereto. The natural language module 122 can be configured to, among other things, receive an input in the form of an initial query from a user, select at least one of a plurality of logical form templates that can be filled with parameters extracted from the received initial query, and employ the at least one logical form template to conduct the database query (i.e., extract the set of data points from the plurality of data points, to generate the primary result).

The natural language module 122, as will be described with further reference to FIG. 3, can also be configured to communicate summaries and highlights (herein also referred to as "embellishments") from individual results in response to receiving the input queries from the user, or to communicate summaries and highlights from a plurality of results associated with a plurality of received input queries in response to an input by the user, or a termination of an analytics session with the user, as will be described. In some other embodiments, as will be described, the natural language module 122 can be configured to audibly communicate, in natural language, ranked follow-up questions in accordance with providing results to a user-provided input query.

The server 140 can include one or more server computing device(s) configured in a network environment, or can include a single computing device hosting, in some embodiments, an application service for the statistical analytics application 114. Each server computing device can include one or more processors, and one or more computer-readable media. The computer-readable media may include computer-readable instructions executable by the one or more processors. The instructions may correspond to one or more applications, such as statistical analytics application 114, shown on server device 140. The server 140 can be configured to store, among other things, computer-readable instructions for hosting the statistical analytics application 114, raw data and user profile information in memory 124, and more, in a memory (not shown). The memory can be comprised of one or more computer-readable media, or may comprise one or more database(s) (not shown) for storing data, as can be appreciated by one of ordinary skill in the art.

The server 140 can comprise a web server, such as Apache®, IIS®, nginx®, or GWS®, among many others, and can be configured to communicate over the network 130 to provide application services for performing statistical analytics to users on a client device via browser 112 or statistical analytics application 114. While the standard network protocol for communication is HTTP, it is contemplated that any network protocol can be used to distribute information between the server 140 and the statistical analytics application 114 of client device 110a. In more detail, if the statistical analytics application 114 is communicated to the client device 110a over the World Wide Web and accessed via browser 112, the server 140 can be configured to provide dynamic code, or the like, to users for navigating a workflow directed to performing statistical analytics. If the statistical analytics application 114 is a standalone application installed on the client device 110a, in some embodiments, the server 140 can be configured to provide cloud services for storing and retrieving raw data and/or user profile information, as stored in memory 124, by the statistical analytics application 114.

Moving now to FIG. 2, the query processing module 200 is configured with various subcomponents and/or submodules, as will be described herein, so as to facilitate a contextually-driven bilateral Q&A conversation for conducting statistical analyses. In embodiments described herein, the query processing module 200 can retrieve, and in some embodiments store, information in a memory 210, such as a database or other computer-readable media also portrayed as memory 124 in FIG. 1. The memory 210 can be configured to store raw data 212, which includes a plurality of data points available for conducting statistical analytics thereon. The memory 210 can also be configured to store session data 214, which includes data about each step of an analytics session (i.e., queries and results), which can be retrieved to provide a final data story associated with the analytics session, as will be described. The memory 210 can also be configured to store user profile information 216, which can include user preferences corresponding to analytics that are of particular interest to the user.

For example, users can specifically define, using the statistical analytics application 114 of FIG. 1, particular defined data attributes (e.g., regions, time frames, products, or other characteristics potentially associated with the raw data 212), that are either of particular interest or of no interest to the user when conducting a statistical analysis on raw data 212. As was described herein above, the user's profile information 216 can also include the user's preferred definition of a top distribution (e.g., 75%, 80%, 85%, etc.), which can also be defined using statistical analytics application 114 of FIG. 1. As such, the tail distribution would be the remaining percentage after having defined the top distribution. For instance, if the user's profile information defines a preferred top distribution to be 75%, then the tail distribution would calculated as 25% (i.e., 100%−75%). As will be described, the user's profile information is retrieved by or provided to the query preprocessing module 220 for defining a set of data points from the plurality of data points in raw data 212, and generating a primary result.

Implementation of the features described herein for facilitating a contextually-driven bilateral Q&A conversation for conducting statistical analyses can be configured using, for example, sub-modules including a query preprocessing module 220, a dimension ranking module 230, a distribution comparison module 240, and a trend comparison module 250. Other modules may additionally or alternatively be included in other embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, the query preprocessing module 220 is configured to receive an initial query, for instance, from natural language module 122 of FIG. 1, as will be described. Based on one or more parameters associated with the initial query and, in some embodiments, user preferences retrieved from the analyst user's profile information 216, query preprocessing module 220 receives the user's initial query and/or the parameters associated therewith and preprocess the set of data points from the plurality of data points in raw data 212 that correspond to the parameters of the received initial query to generate a primary result.

In more detail, the query preprocessing module 220 can retrieve analyst user preference information stored in the user's profile information 216 and, based on such information, remove a portion of data points from the raw data 212 that is not relevant or of no particular interest to the user. For example, if a user is not interested in conducting, generally, an analysis that includes particular regions, time frames, products, or other characteristics associated with the raw data 212, a portion of data points from the initially defined set of data points that have such characteristics are removed from consideration for further processing and analysis. In this regard, the set of data points resulting from preprocessing is employed to formulate the primary result. By way of a non-limiting example only, a user may define in the user's profile information 216 that he is not interested in conducting analytics on any portions of raw data that may be related to "subscribers" not having a "country" value of "North America." In other words, the analyst user is only interested in conducting analytics on U.S.-based subscribers. In this example, the query preprocessing module 220 would remove, for the user's analytics session, all data points from the raw data 212 with a defined data attribute of "country" having the value of "North America."

In another embodiment, the query preprocessing module 220 analyzes the plurality of data points in raw data 212 and removes from consideration any data points that may be missing information (i.e., values associated with defined data attributes) relevant to the received initial query. For instance, if an analyst user was interested in a particular set of data points that were only applicable to 25% of the plurality of data points in raw data 212, then the query preprocessing module 220 could be configured to analyze the raw data 212 and only generate a result based on a set of data points included in the 25%. Also, in this regard, the set of data points resulting from preprocessing is employed to formulate the primary result. By way of a non-limiting example only, if an initial query was received including user-provided data attributes "subscriber" and "country", and assuming that only 25% of the raw data included "subscribers" having a defined value for the "country" defined data attribute, the query preprocessing module 220 can be configured to remove, for the user's analytics session, all data points from the raw data 212 not having a value for the "country" defined data attribute. To this end, only the 25% of the raw data having such a defined value would be provided.

The query preprocessing module 220 can also be configured to retrieve, from the user's profile information 216, the user's preferred definition of a top distribution (e.g., 75%, 80%, 85%, etc.) percentile. The query preprocessing module 220 utilizes the user-defined top distribution percentile to generate at least a distribution of the set of data points based on the top distribution percentile, and provide for display the graphical representation thereof, using the view generation module 120 of FIG. 1, as will be further described with particular reference to FIGS. 7A-7D. For instance, a user can define a preferred "top distribution" value within his profile information 216, that will be referenced when the query preprocessing module 220 generates a top distribution corresponding to the set of data points.

In some embodiments, the query preprocessing module 220 can also retrieve a tail distribution percentile from user profile information 216, or determine the tail distribution percentile based on the user-defined top distribution percentile, to generate a distribution of the set of data points based on the tail distribution percentile. For instance, a user can define a preferred "tail distribution" value within his profile information 216, that will be referenced when the query preprocessing module 220 generates a tail distribution corresponding to the set of data points. In the alternative, the "tail distribution" value can be automatically determined, based on the defined "top distribution" value provided by the user. The query preprocessing module 220 can also employ the view generation module 120 of FIG. 1 to provide for display the graphical representation of the tail distribution, as will also be described.

In some embodiments, the query preprocessing module 220 can send the primary result to the natural language module 122 for generating and providing for output an embellishment of the primary result, as will be described. The embellishment output can be provided in the form of text on a display, audible output (i.e., via an audio-out port and speakers), or a combination thereof. In this regard, the query preprocessing module 220 has, based on the initial query, narrowed the raw data 212 to a set of data points relevant to the user's initial query, preprocessed the set of data points to further narrow the set of data points for relevance in accordance to the user's personal preferences, and initialized graphical representations and narrative embellishments for output to the user. The natural language module 122, as will be described, can be configured to provide for output a natural language narrative of results. For instance, and by way of non-limiting example only, if the result included a calculated average of "subscribers" over a defined data attribute of "state", an embellishment of the result may be provided as "The average of Subscribers over State is about Fourteen thousand."

In some embodiments, the dimension ranking module 230 is broadly configured to facilitate data exploration by guiding the analyst user with relevant defined data attributes for exploration based on, among other things, the generated primary result from the query preprocessing module 220. In more detail, after the query preprocessing module 220 generates the primary result (i.e., "cleans up" the set of data points for relevance to the user based on profile information and user-provided data attributes), the query processing module 200 can identify a plurality of defined data attributes (i.e., trends, views, correlations, distributions, etc.) associated with the primary result, which are available for exploration by the user. However, numerous defined data attributes associated with the primary result may have no relevance to the user's initial query or preferences.

The goal of the dimension ranking module 230 is, on a high level, to rank the plurality of defined data attributes associated with the set of data points, to generate a subset of defined data attributes that may be relevant to the user's target analysis (i.e., inferred by at least the user-provided data attributes of the initial query or the user's profile information 216). In embodiments, the dimension ranking module 230 can rank the defined data attributes in order of relevance to the user by comparing, among other things, a relevance score for each of the defined data attributes corresponding to the set of data points. More particularly, each data point within the set of data points can have one or more defined data attributes having values associated therewith. The one or more defined data attributes associated with the set of data points are each given a relevance score, which can be calculated using ensemble tree learning methods comparing, among other things, the user-provided data attributes, values of defined data attributes associated with the primary result, user profile information, or a combination thereof. Ensemble tree learning methods, such as the random forest attribute importance ranking algorithm, can be employed by the dimension ranking module 230 to calculate a relevance score to each defined data attribute associated with the set of data points. For instance, and by way of example only, some example ranked follow-up questions to the initial query, "How many subscribers were added, group by state and product?" and generated by the dimension ranking module 230 may include: (1) By subscription type, how many new subscribers were added?; (2) By state and subscription type, how many new subscribers were added?; and (3) By market, how many new subscribers were added? While some embodiments can employ a random forest attribute importance ranking algorithm, it is contemplated that any ensemble learning algorithm (e.g., Bayes optimal classifier, bootstrap aggregation, boosting, Bayesian parameter averaging, Bayesian model combination, bucket of models, stacking, etc.) can be employed within the scope of the present disclosure.

While the aforementioned follow-up questions are described in a natural language form, it is contemplated that the follow-up questions are not necessarily generated in natural language form by dimension ranking module 230. In fact, the dimension ranking module 230 may be configured to evaluate and rank the plurality of defined data attributes based only on the values associated with each defined data attribute. In more detail, each available defined data attribute may be relevant to one or more parameter values (e.g., subscription types, regions/states, new subscribers, added or removed, etc.) associated with defined data attributes in the set of data points. As such, using defined data attribute parameter values alone, the dimension ranking module 230 can be configured to employ the natural language module 122 of FIG. 1 to generate and provide for output an embellishment or natural language narration of the follow-up questions, as was provided in the aforementioned follow-up questions.

The embellishment output can be provided in the form of text on a display, audible output (i.e., via an audio-out port and speakers), or a combination thereof. In this regard, the dimension ranking module 230 has, based on at least the initial query, analyzed and ranked, in order of relevance, a plurality of data attributes associated with the set of data points to generate a set of follow-up questions to present to the user upon providing for output a primary result based on the initial query.

In some other embodiments, once the set of follow-up questions are presented to the user, the user can respond by "selecting" (e.g., providing an audible input to natural language module 126 of FIG. 1) or otherwise providing a manual input to statistical analytics application 114 of FIG. 1 also selecting a follow-up query from the set of provided follow-up questions. The follow-up query, in essence, continues the bilateral Q&A conversation for additional processing and analysis on the set of data points. In various embodiments, the dimension ranking module 230 is configured to analyze and rank a plurality of defined data attributes that are relevant to at least the most-recently received query (e.g., an initial query or a most-recently selected follow-up question from the provided set of follow-up questions).

In some embodiments, the distribution comparison module 240 is configured to, on a high level, compare a plurality of distributions and identify statistical similarities and/or differences therebetween. In some embodiments, as was described, the initial query received from the user may include two or more user-provided data attributes that are of particular interest to the user. The distribution comparison module 240 can be configured to compare the distribution associated with a set of data points for each of the two or more user-provided data attributes using, by way of example only, a Komogorov-Smirnov ("K-S") test. Moreover, the distribution comparison module 240 can further provide a clustering of similar distributions. By way of example only, if the initial query referenced a user-provided data attribute of subscribers grouped by user-provided data attributes: (1) Product and (2) State, the query processing module 200 can be configured to employ at least the described subcomponents and/or submodules therein to, by way of example only, generate the distribution of products for each state separately and cluster them using statistical similarities between the two distributions.

In some embodiments, the trend comparison module 250 can be configured to, on a high level, compare trends in one or more generated distributions to a benchmark (i.e., average) distribution associated therewith. The trend comparison module 250 can employ any comparison technique when comparing distributions, such as, by way of a non-limiting example, a pointwise comparison. By way of example only, if a distribution of subscribers of a product over 6 quarters of time is compared to an average distribution of the product across the same time periods, the trend comparison module 250 can be configured to detect significant differences between the generated distribution and the benchmark distribution. When comparing distributions, the trend comparison module 250 can be configured to detect all or only "significant" differences between the generated distribution and the benchmark distribution. Differences detected between the generated distribution and the benchmark distribution can be determined based on percentile differences therebetween that exceed a predefined threshold (e.g., >10%).

The trend comparison module 250 can also be configured to employ the natural language module 122 of FIG. 1 to provide for output an embellishment or natural language narration of the detected any or "significant" differences between the generated distribution and the benchmark distribution. The embellishment output can be provided for output in the form of text, audible output (i.e., via an audio-out port and speakers), or a combination thereof. In this regard, the trend comparison module 250 compares one or more generated distributions to corresponding benchmark distribution(s), to generate and provide for output graphical representation(s) and embellishment output(s) reporting detected differences therebetween.

Moving now to FIG. 3, the natural language module 300 is configured with various subcomponents and/or submodules, as will be described herein, so as to facilitate natural language interpretation and natural language embellishment generation during a contextually-driven bilateral Q&A conversation for conducting statistical analyses. Implementation of the features described herein for facilitating natural language interpretation and natural language embellishment generation can be configured using, for example, sub-modules including a natural language comprehension module 310, and a natural language embellishment module 320. Other modules may additionally or alternatively be included in other embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, the natural language comprehension module 310 is configured to, on a high level, receive audible (i.e., spoken) inputs from a user, and comprehend the received audible inputs to perform actions in response thereto. More particularly, the natural language comprehension module 310 can be configured to receive an input in the form of an audible initial query (i.e., via an audio input, such as a microphone), select at least one of a plurality of logical form templates that can be filled with parameters recognized and extracted from the received initial query, and either provide to another component, subcomponent, module, or submodule, the selected logical form template filled with the extracted parameters from the initial query, or utilize the selected logical form template to conduct a query on, for instance, raw data 212 of FIG. 2. Although not described in detail herein, disclosure for the comprehension and processing of received audible input queries is incorporated herein with particular reference to U.S. Non-Provisional patent application Ser. No. 14/540,602, entitled GENERATING A QUERY STATEMENT BASED ON UNSTRUCTURED INPUT, and U.S. Non-Provisional patent application Ser. No. 14/538,393, entitled ORGANIZING DATA IN A DATASET.

In some embodiments, the natural language embellishment module 320 is configured to generate a summary of and/or highlights from individual results, in the form of a natural language narrative (i.e., an embellishment), in response to receiving and processing an input query from the user. In some other embodiments, the natural language embellishment module 320 can also be configured to communicate an embellishment from a plurality of results (i.e., a final data story), in response to an input corresponding to the termination of the analytics session by the user, or in response to the exhaustion of follow-up questions associated with an analytics session with the user, as will be described.

Figure 2:
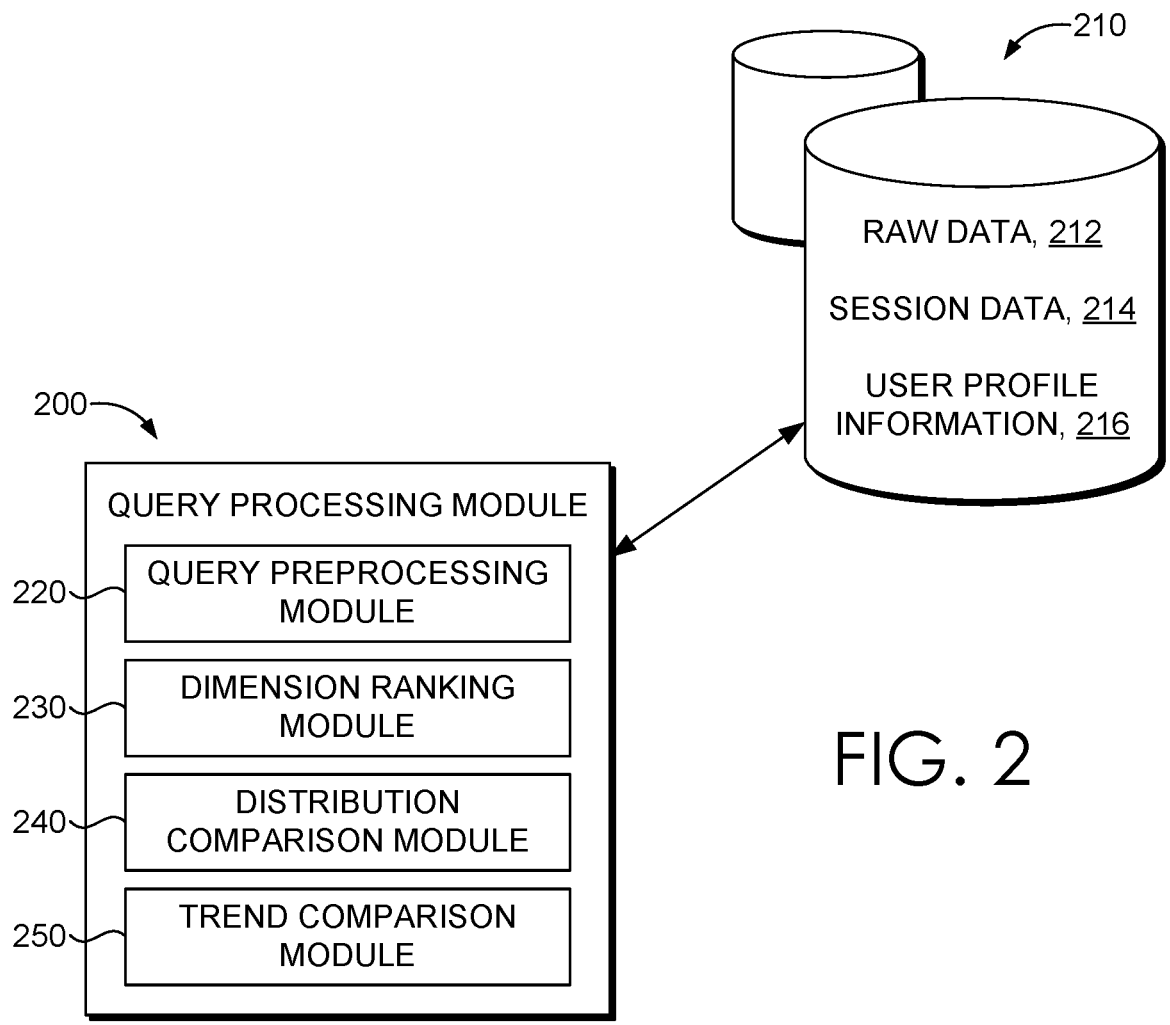
FIG. 2 is a diagram illustrating an exemplary query processing module, in accordance with some implementations of the present disclosure.

In some other embodiments, the natural language embellishment module 320 can be configured to provide for output in text, audio, or a combination thereof, a natural language narrative of ranked follow-up questions generated from, for instance, query processing module 200 of FIG. 2.

Figure 3:
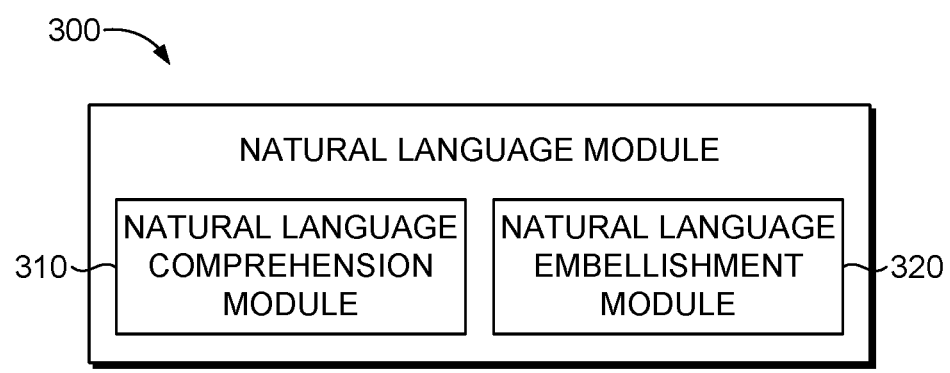
FIG. 3 is a diagram illustrating an exemplary natural language module, in accordance with some implementations of the present disclosure.
Figure 4:
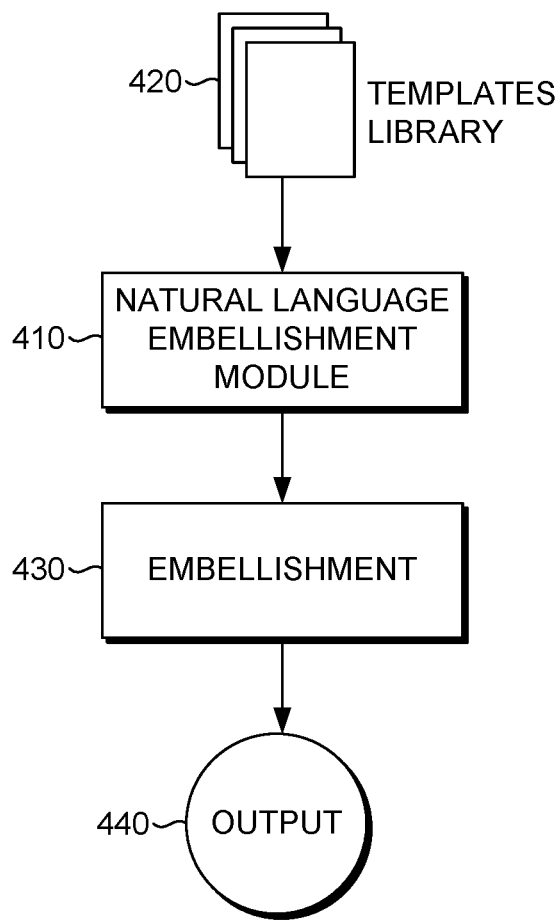
FIG. 4 is a block diagram illustrating the flow of information for generating embellishments, in accordance with some implementations of the present disclosure.

With reference now to FIG. 4, a block diagram 400 illustrating the flow of information for generating embellishments using natural language embellishment module 410, a submodule of the natural language module of FIG. 3, is provided. In some embodiments, the generation of embellishments using results from, for instance, query processing module 116 of FIG. 1, utilizes a natural language generation ("NLG") templates library 420 that includes a plurality of predefined forms or NLG templates (herein also referred to as "templates") that are each configured to be filled by specific data and information. The templates are utilized by the natural language embellishment module 410 to convert analytical results into natural language form. By way of a non-limiting example only, if a result based on an analytical query included the data values of the aggregate total of "subscribers" divided by the number of "states" equaling a value of 14,021, the natural language embellishment module 410 can be configured to identify the appropriate NLG template to convert the data values into a plain English (or other applicable language) narration. An exemplary narration would read something like, "the average of Subscribers over State is about Fourteen thousand." As described, the NLG template is utilized to convert data attributes and corresponding values derived from a result, into a natural language embellishment.

Based on the data and information provided in the generated result (i.e., primary result or subsequent result(s)), a corresponding template having fields that line up with the data and information provided in the generated result is selected. Once an appropriate template is selected for use by natural language embellishment module 410, the selected template is filled with specific data and information from the generated result and a corresponding narration or embellishment 430, including the specific data and information, is provided for output 440 to the user.

Figure 5:
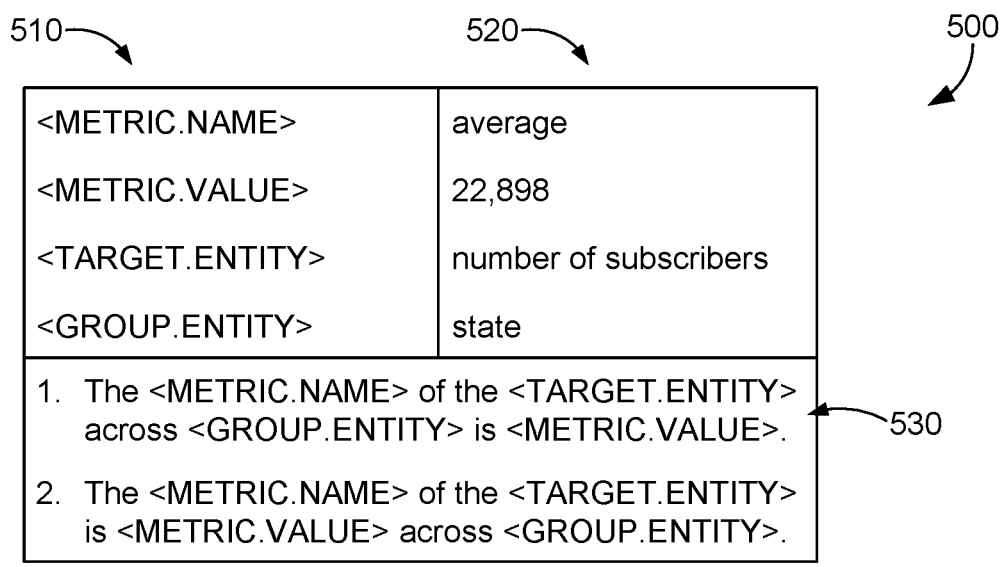
FIG. 5 is an exemplary natural language generation template, in accordance with some implementations of the present disclosure.

Moving now to FIG. 5, an exemplary NLG template 500 in accordance with some embodiments of the present disclosure is provided. In the illustrated example template 500, a set of data fields 510, a set of data values 520 corresponding to the data fields 510, and one or more natural language utterances or embellishments 530 also corresponding to the data fields 510 is provided. The illustrated data fields 510, data values 520, and embellishments 530 are merely exemplary and are not intended to be limiting. As illustrated, the exemplary template 500 can include a predefined set of data fields 510. In the provided example, the data fields 510 include fields: <METRIC.NAME>, <METRIC.VALUE>, <TARGET.ENTITY>, and <GROUP.ENTITY>. The template library, such as templates library 420 of FIG. 4, can include templates having data fields of any data type (e.g., metrics names, metrics values, target names, group names, etc.) that are relevant to statistical analysis (i.e., metrics, averages, maximums, minimums, etc.). The template 500 can also include one or more embellishments 530, which are natural language utterances that have empty spaces for data values 520 that correspond to the data fields 510.

While the provided example illustrates a template 500 having the data fields 510 filled with information, it is contemplated that each template 500 in an NLG template library is not filled with information, but is used for determining an appropriate embellishment 530 based on available data fields 510 in the generated result(s). For example, if a generated result included only analytics information, such as the metric name, metric value, target entity, and group entity, some processing must be performed to convert the generated result into an embellishment. As such, in order to convert such information into an embellishment, the natural language embellishment module 320 of FIG. 3 can analyze the generated result, and search the NLG templates library (for instance, templates library 420 of FIG. 4) to select an appropriate template that corresponds to the data types available in the generated result. In this example, when the generated result includes data fields: METRIC.NAME, METRIC.VALUE, TARGET.ENTITY, and GROUP.ENTITY, natural language embellishment module 320 of FIG. 3 can search the templates library to select template 500, as the data fields in template 500 match the data fields of the generated result. To this end, the embellishments 530 are supplemented with the corresponding data values 520 and provided for output, as was described herein above.

As was discussed herein above, the natural language embellishment module 320 of FIG. 3 can also be configured to communicate a final data story from a plurality of results, in response to an input corresponding to the termination of the analytics session by the user, or in response to the exhaustion of follow-up questions associated with an analytics session with the user. In essence, during the analytics session, each generated result that is provided for output to the user in the form of an embellishment can be logged, for instance, in memory 124 of FIG. 1. In some embodiments, each NLG template associated with each generated result is logged in a compilation to form a set of templates associated with the analytics session. In this regard, in some embodiments, the natural language embellishment module 320 of FIG. 3 can further be configured to aggregate the plurality of NLG templates associated with an analytics session, merge similar and relevant templates into one or more subsets of templates, and generate a natural language utterance for each of the one or more subsets of templates to provide for output the final data story.

Figure 6:
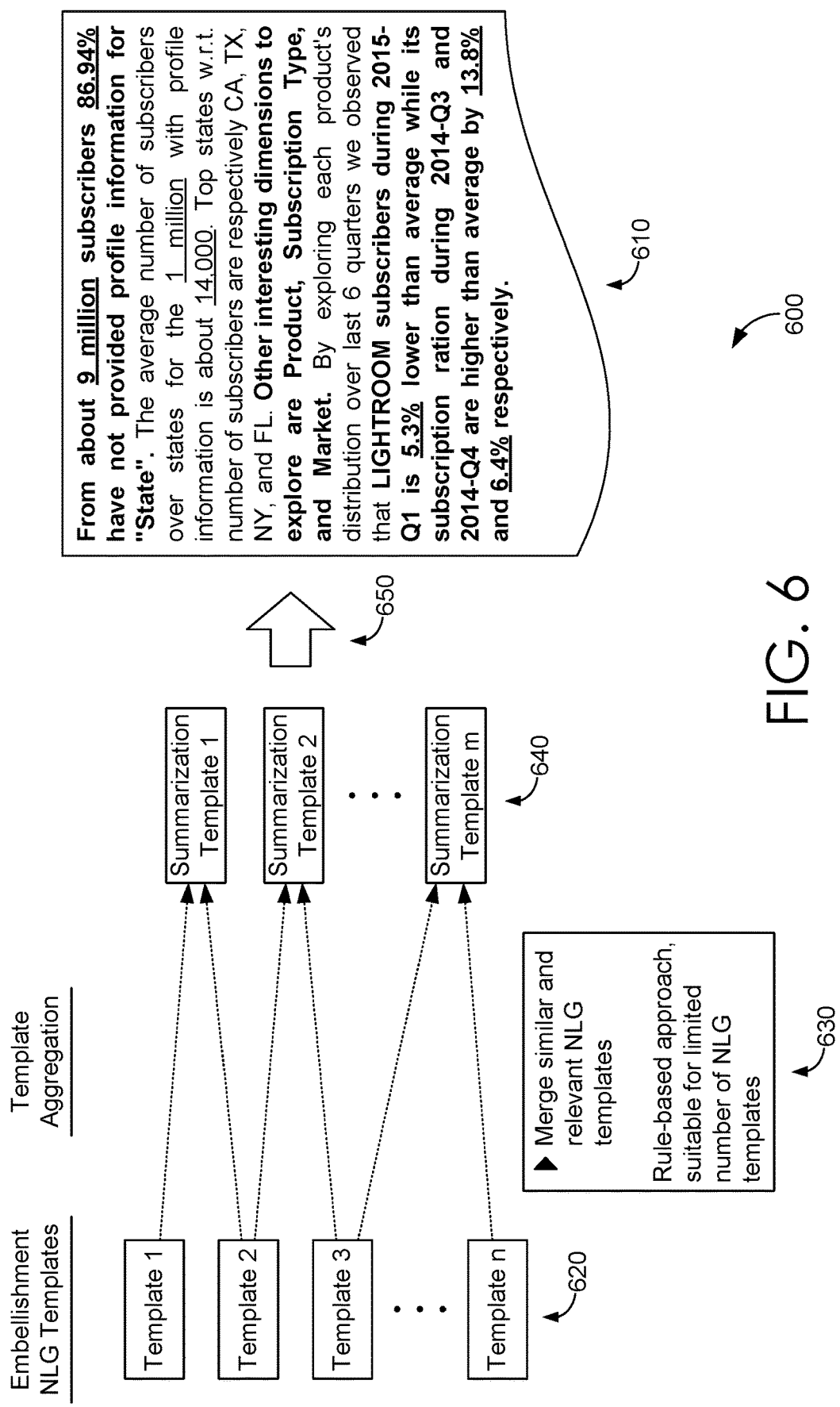
FIG. 6 is a block diagram illustrating stages associated with generating a final data story, in accordance with some implementations of the present disclosure.

Looking now to FIG. 6, an exemplary block diagram 600 illustrating the various stages associated with generating a final data story 610 is presented in accordance with embodiments of the present disclosure. While the illustrated example provides for a particular combination of templates and generates, as a non-limiting example only, an exemplary final data story 610, it is contemplated that any configuration and combination of templates to produce a unique final data story can be produced. As was described with particular reference to FIG. 5, a statistical analytics application can employ a natural language embellishment module, such as natural language embellishment module 320 of FIG. 3, to select, for each of one or more results generated based on queries provided by the user, an NLG template that corresponds to the result. In some embodiments, each of the NLG templates 620 can be analyzed by natural language embellishment module 320 of FIG. 3 to aggregate 630 the one or more NLG templates 620 into one or more subsets of templates that each include similar and relevant NLG templates. For instance, the NLG templates 620 can be aggregated 630 with other NLG templates 620 having, among other similarities, common data types or data values, as described with particular reference to FIG. 5. Once the NLG templates 620 are aggregated 630 into one or more subsets 640 based on similarity and/or relevance, each subset 640 can then be merged 650 into a single and contextually-organized natural language utterance, referred to herein as the final data story 610.

A statistical analytics application can also include a view generation module, such as view generation module 120 of FIG. 1, which can be configured to generate and provide for display graphical representations of data when providing for output results or "answers" during a contextually-driven bilateral Q&A conversation for conducting statistical analyses. Other components or modules in addition to those shown in FIG. 1 may additionally or alternatively be included in other embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, the view generation module 120 can be configured to receive, among other things, one or more generated results, or references to the one or more generated results from other modules and/or submodules of a statistical analytics application, such as from query processing module 200 of FIG. 2. The generated results can be primary results, secondary results, or any other results generated by other modules and/or submodules of the statistical analytics application. The results can include one or more sets of data points that result from preprocessing, distribution comparisons, trend comparisons, and the like. In some embodiments, the view generation module 120 can be configured to receive, in addition to or in lieu of the one or more generated results, instructions for accessing the data points associated with the one or more generated results (i.e., in memory) and further instructions for generating one or more graphical representations of the one or more generated results.

The generation of a graphical representation of a generated result can include the plotting of data points corresponding to the generated result. For instance, looking now at FIG. 7A, an exemplary illustration of a graphical representation 700*a* of a result 710*a* generated from preprocessing an initial query is provided, as would be generated by query preprocessing module 220 of FIG. 2, in one embodiment. The graphical representation 700*a* of the exemplary preprocessing result illustrates a "cleaned-up" distribution graph 710*a* in accordance with an exemplary initial query, for instance "How many subscribers were added, group by state and product?" As was described with particular reference to the query preprocessing module 220 of FIG. 2, the query preprocessing module can be configured to generate cleaner results by removing data points from raw data that are not relevant to the initial query (i.e., subscribers that do not provide state or product information). As was also described with particular reference to natural language embellishment module 410 of FIG. 4, an embellishment 720*a* is also provided to explain the results in natural language.

Figure 7A:
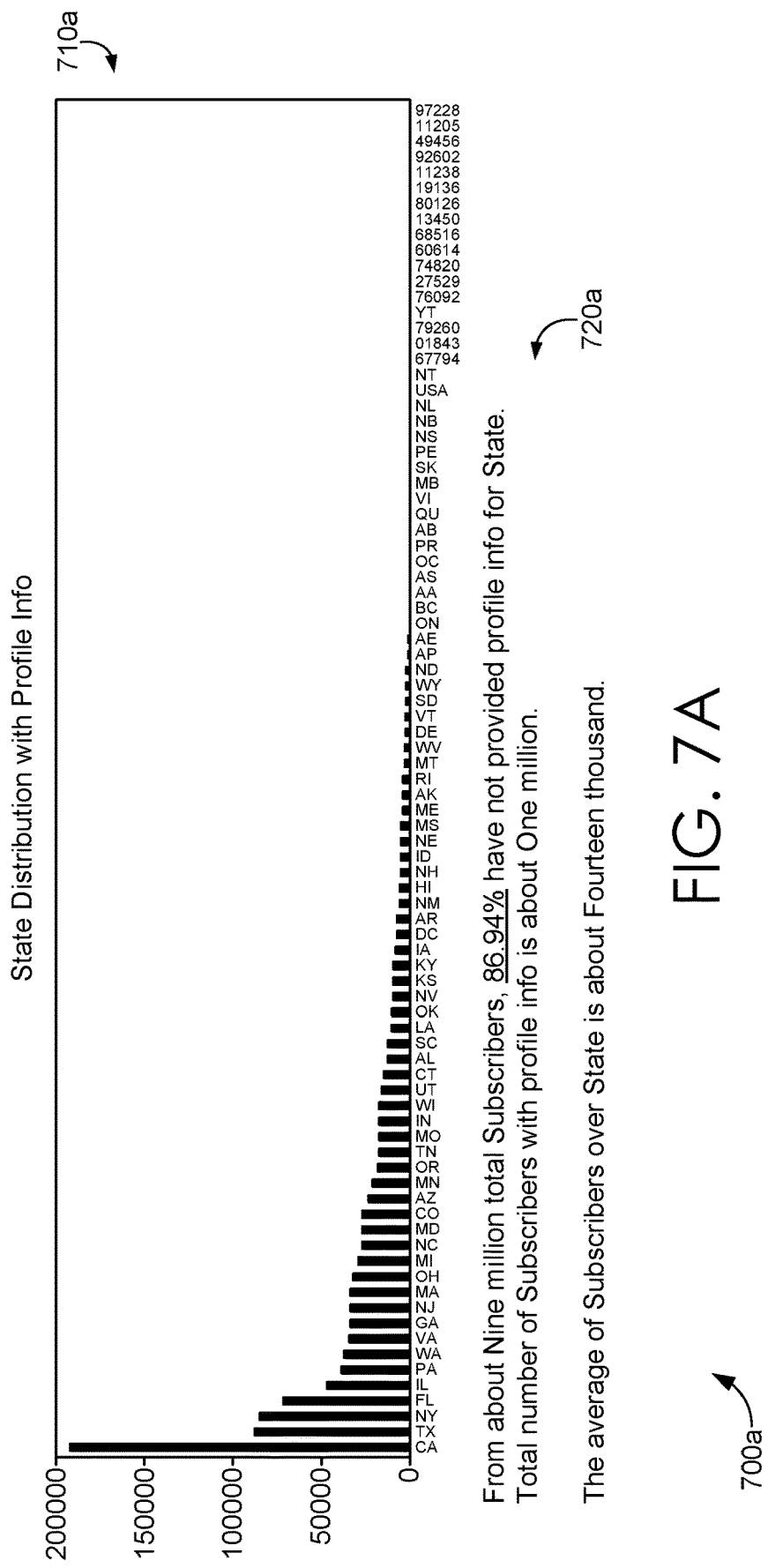
Figure 7B:
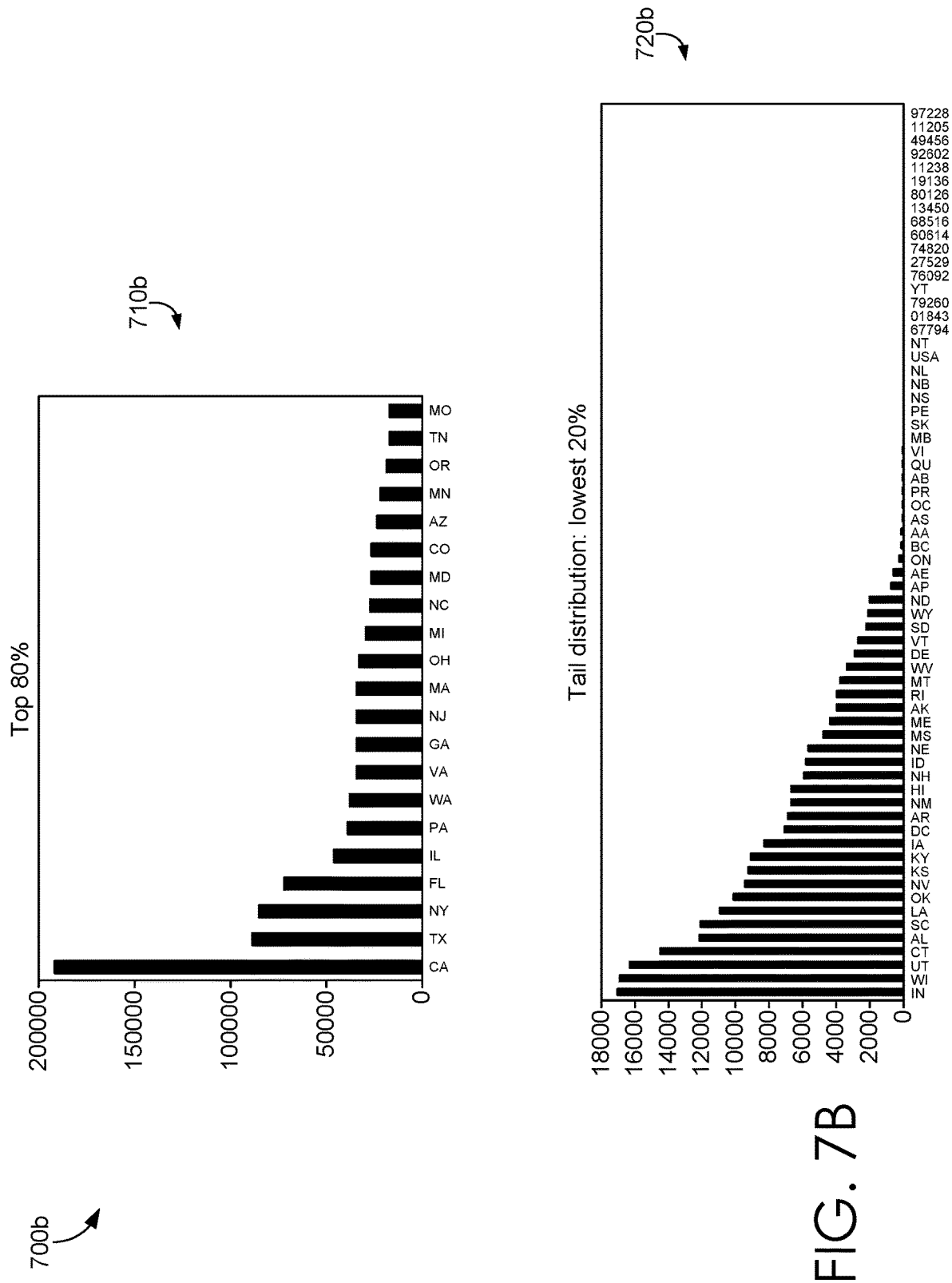

In another instance, looking now at FIG. 7B, an exemplary illustration of a graphical representation 700*b* of a result 710*b,* 720*b* generated from preprocessing an initial query is provided, as would be generated by query preprocessing module 220 of FIG. 2, in another embodiment. The graphical representation 700b of the exemplary preprocessing result illustrates a head distribution graph 710b and a tail distribution graph 720b in accordance with the exemplary initial query, "How many subscribers were added, group by state and product?" As was described with particular reference to the query preprocessing module 220 of FIG. 2, the query preprocessing module can also be configured to generate graphical representations of a head distribution 710b and a tail distribution 720b in accordance with preferred percentage values defined in the analyst user's profile information, as was described in particular reference to FIG. 2.

Figure 7C:
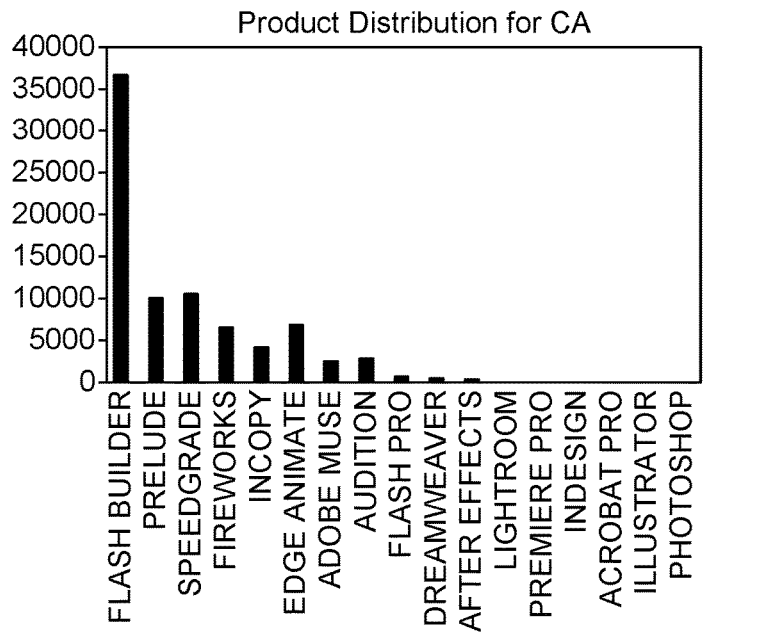
Figure 7C:
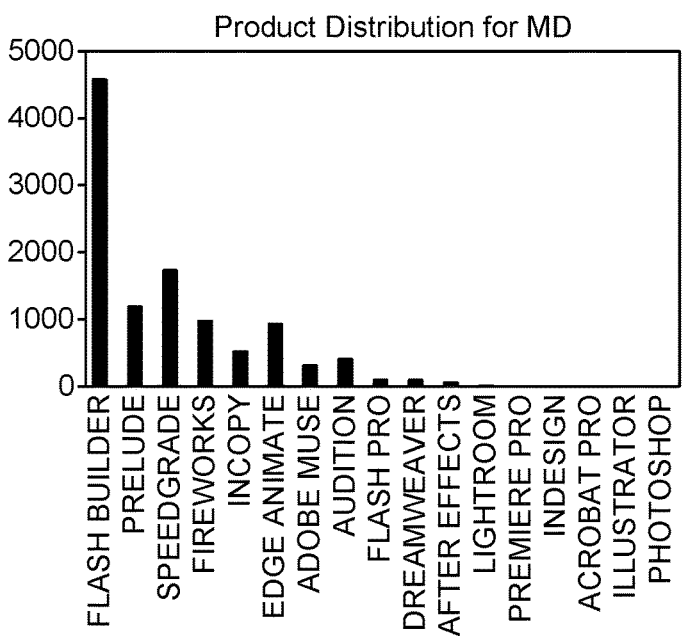

Looking now to FIG. 7C, the generation of a graphical representation 700c can also include the plotting of data points corresponding to a result 710c, 720c generated from distribution comparison module 240 of FIG. 2, in one embodiment. The graphical representation 700c of the exemplary distribution comparison result illustrates two distinct distribution graphs 710c, 720c in accordance with the exemplary initial query, "How many subscribers were added, group by state and product?" Because the analyst user in this example is interested in distribution of subscribers over two distinct user-provided data attributes (i.e., Product and State), the distribution of products for each state is separately generated and clustered using statistical similarities between distributions, as was described in more detail with reference to distribution comparison module 240 of FIG. 2. As such, in the provided example illustration, the states 715c, 725c in each result cluster 710c, 720c demonstrate statistically similar product distributions.

Looking now to FIG. 7D, the generation of a graphical representation 700d can also include the plotting of data points corresponding to a result 710d generated from trend comparison module 250 of FIG. 2, in one embodiment. The graphical representation 700d of the exemplary trend comparison result illustrates a distribution graph 710d in accordance with the exemplary initial query, "How many subscribers were added, group by state and product?" In some embodiments, a comparison between resulting distributions (e.g., subscribers of a product in state) over a temporal period (e.g., 6 quarters) can be made with an average distribution of the product across the same temporal period. As was described with reference to trend comparison module 250 of FIG. 2, and by way of example only, a distribution of "subscribers" of a particular "product" in a particular "state" (e.g., Texas) over a temporal period (e.g., Q1 2014 to Q2 2015—6 quarters) can be compared to the average distribution of the "product" in all "states" over the same temporal period (Q1 2014 to Q2 2015). As such, in the provided example illustration, the quarter-joined distribution graph 710d for a product is generated. As was also described with particular reference to natural language embellishment module 410 of FIG. 4, an embellishment 720d is provided to describe, in natural language, significant differences between the current distribution and the benchmark distribution.

Figure 8:
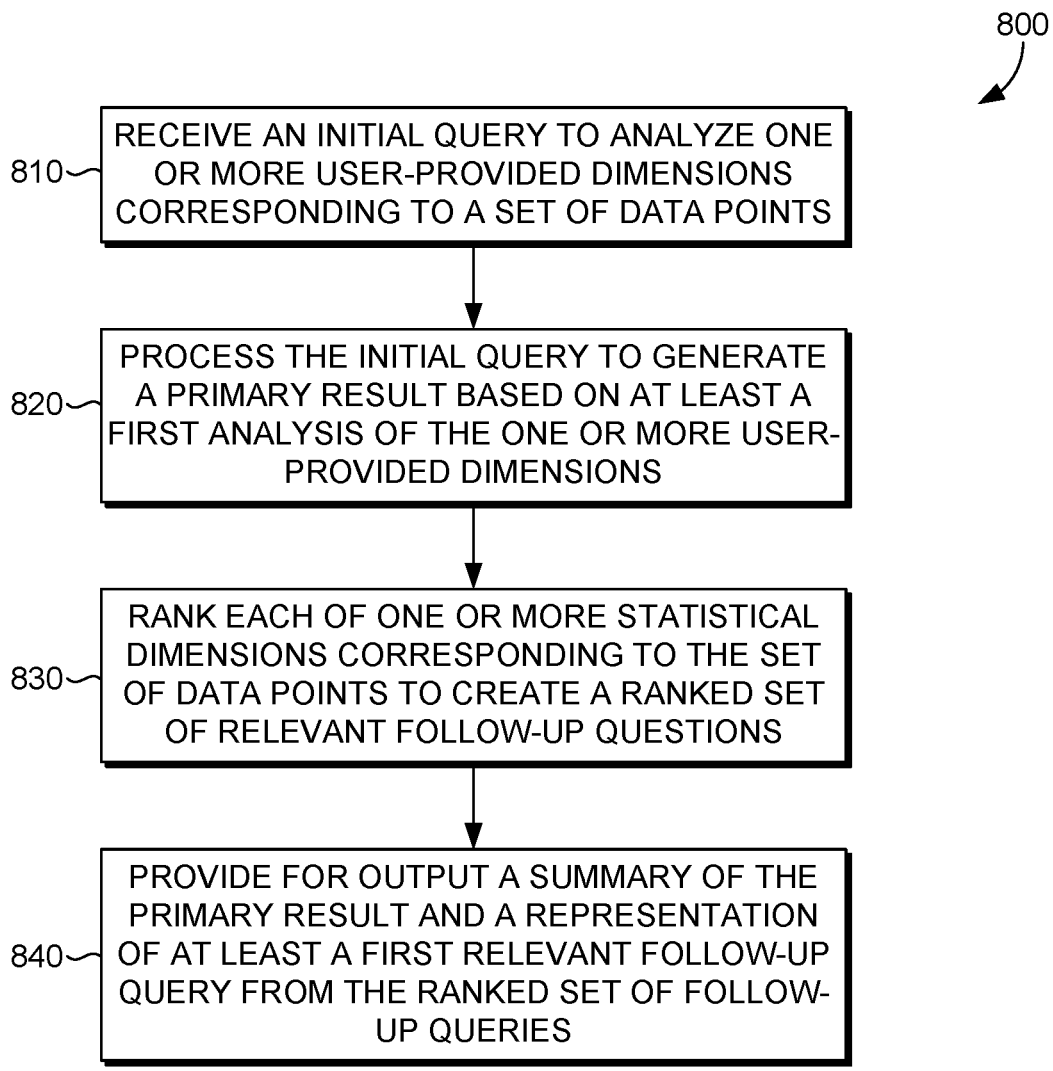
FIG. 8 is a flow diagram showing a method for facilitating data analytics in a bilateral Q&A format, in accordance with some implementations of the present disclosure.

Having described various aspects of the present disclosure, exemplary methods are described below for providing a digital assistant operable to conduct data analytics in a bilateral Q&A format. Referring to FIG. 8 in light of FIGS. 1-7C, FIG. 8 is a flow diagram showing a method 800 for facilitating data analytics in a bilateral Q&A format. Each block of method 800 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 810, an initial query to analyze one or more user-provided data attributes corresponding to a set of data points in raw data is received. The initial query can be received in the form of one or more inputs from a user input device. In accordance with some embodiments described herein, the initial query can be received in natural language (i.e., audibly spoken by the user) for processing. For example, if a user wanted to perform a statistical analysis on a collection of raw data, the user could initiate an analytics session with the digital assistant by speaking an initial query. For instance, a non-limiting example of an initial query spoken by a user could sound like, "How many subscribers were added, group by state and product?"

After receiving the initial query, the initial query is processed, at block 820, to generate a primary result based on an analysis of at least one user-provided data attribute corresponding to the set of data points. The analysis includes querying, among other things, defined data attributes that correspond to the set of data points, using the user-provided data attribute that is received in the initial query. In this way, only a portion of data points from the set of data points having defined data attributes that correspond to the user-provided data attribute is provided for analysis. In some embodiments, the analysis may further include applying statistical formulas on the portion of data points to identify various distributions, trends, comparisons, and the like. By way of a non-limiting example only, the initial query of: "How many subscribers were added, group by state?" can generate a primary result based on an analysis of a portion of the set of data points that have a defined data attribute of, among other things, "subscriber" and "state." The analysis conducted on the portion of the set of data points may vary, based on the query parameters provided within the initial query. In this example, the analysis includes a function for counting a total number of subscribers, sorted by at least the various values associated with the subscribers' defined "state" data attributes.

In some instances, the initial query can include a plurality of user-provided data attributes having particular relevance to the user. As such, the primary result generated from an initial query that includes a plurality of user-provided data attributes may include, in addition to the first analysis, additional analyses of other user-provided data attributes also corresponding to the set of data points. For instance, in the non-limiting example of the initial query, "How many subscribers were added, group by state and product?", the user expresses interest in subscribers along two distinct user-provided data attributes—state and product. As such, the primary result may include an analysis on both user-provided data attributes. By way of a non-limiting example only, the initial query of: "How many subscribers were added, group by state and product?" can generate a primary result based on an analysis of a portion of the set of data points that have a defined data attribute of, among other things, "subscriber", "state", and "product." In this example, the analysis includes a function for counting a total number of subscribers, sorted by at least the various values associated with the subscribers' defined "state" and "product" data attributes.

When the primary result is generated, one or more defined data attributes that are associated with the set of data points are ranked, at block 830, in order of relevance to the user, to create a ranked set of relevant follow-up queries. Ranking in order of relevance to the user can be conducted by comparing, among other things, a relevance score for each of the defined data attributes corresponding to the set of data points. In more detail, the data points within the set of data points can each have one or more defined data attributes associated therewith. These one or more defined data attributes are each given a relevance score, which can be calculated using ensemble tree learning methods comparing, among other things, the user-provided data attributes, defined data attributes associated with the primary result, user profile information, or a combination thereof. Ensemble tree learning methods, such as the random forest attribute importance ranking algorithm, can be employed to calculate a relevance score to each defined data attribute associated with the set of data points. For instance, and by way of example only, some example ranked follow-up questions to the initial query, "How many subscribers were added, group by state and product?" may include: (1) By subscription type, how many new subscribers were added?; (2) By state and subscription type, how many new subscribers were added?; and (3) By market, how many new subscribers were added?

At block 840, a summary of the primary result and a representation of at least one relevant follow-up query from the ranked set of relevant follow-up queries is provided for output. As was described, the output can be provided in the form of text, graphical representations (i.e., graphs), audible narrations, or a combination thereof. In this regard, and by way of example only, the summary of the primary result may be both provided for display (for instance, on a monitor) in the form of a graph, chart, or other statistical analytics representation of data. The summary may also be provided for display in the form of text, either alone or in combination with the graph, chart, or other representation. In another instance, the summary can be provided, in natural language, as an audible output (for instance, through audio speakers) to recite an embellishment of the primary result. Moreover, in some instances, at least one of the follow-up queries, ranked in block 830, can also be provided for output to the user in any of the aforementioned output methods.

Figure 9:
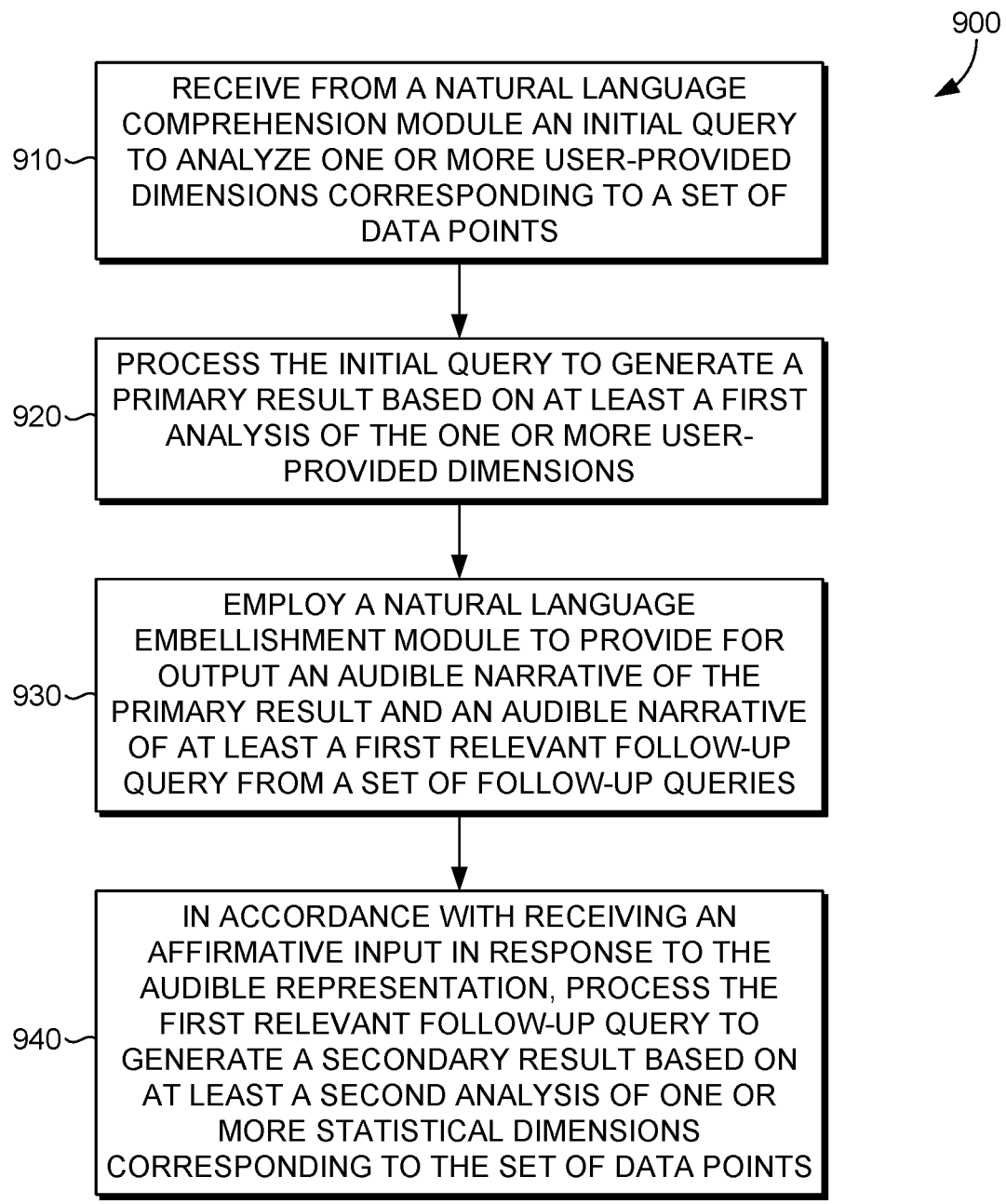
FIG. 9 is a flow diagram showing a method for facilitating data analytics in a bilateral natural language Q&A format, in accordance with some implementations of the present disclosure.

Referring now to FIG. 9 in light of FIGS. 1-7C, FIG. 9 is a flow diagram showing a method 900 for facilitating data analytics in a bilateral natural language Q&A format. Each block of method 900 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 910, an initial query to analyze one or more user-provided data attributes corresponding to a set of data points is received from a natural language comprehension module, such as natural language comprehension module 310 of FIG. 3. The natural language comprehension module, as was described, is configured to receive a natural language input and convert this input into the initial query. At block 920, the initial query is processed to generate a primary result based on a first analysis of the one or more user-provided data attributes corresponding to the set of data points. The first analysis is defined by, among other things, the parameters (i.e., the data fields) of the initial query. At block 930, a natural language embellishment module, such as natural language embellishment module 320 of FIG. 3, is employed to provide for output an audible narrative of the primary result and an audible narrative of at least a first relevant follow-up query from a set of relevant follow-up queries based on, among other things, the generated primary result. At block 940, an affirmative input in response to the audible representation of the first relevant follow-up query is received (for instance, from natural language comprehension module 310 of FIG. 3). In accordance with receiving the affirmative input, the first relevant follow-up query is processed to generate a secondary result based on at least a second analysis of one or more data attributes corresponding to the set of data points. The second analysis is defined by, among other things, the parameters (i.e., the data fields) of the first relevant follow-up query.

Figure 10:
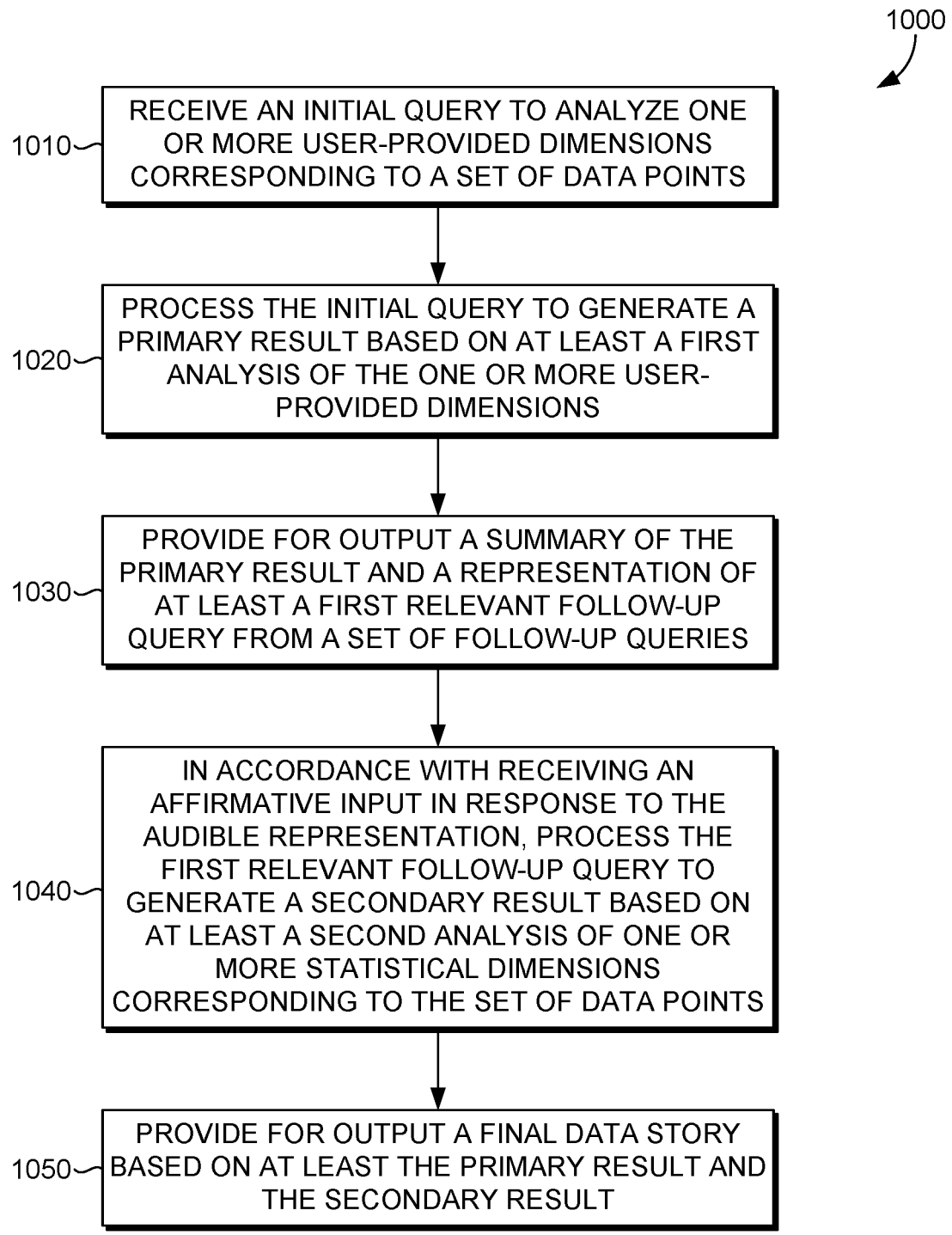
FIG. 10 is a flow diagram showing a method for facilitating data analytics in a bilateral Q&A format and for providing a summarizing data story thereof, in accordance with some implementations of the present disclosure.

Referring now to FIG. 10 in light of FIGS. 1-7C, FIG. 10 is a flow diagram showing a method 1000 for facilitating data analytics in a bilateral Q&A format and for providing a summarizing data story thereof. Each block of method 1000 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 1010, an initial query to analyze one or more user-provided data attributes corresponding to a set of data points is received. At block 1020, the initial query is processed to generate a primary result based on a first analysis of the one or more user-provided data attributes corresponding to the set of data points. The first analysis is defined by, among other things, the parameters (i.e., the data fields) of the initial query. At block 1030, a summary of the primary result and a representation of at least a first relevant follow-up query from a set of relevant follow-up queries based on at least the generated primary result is provided for output. At block 1040, an affirmative input in response to the output representation of the first relevant follow-up query is received. In accordance with receiving the affirmative input, the first relevant follow-up query is processed to generate a secondary result based on at least a second analysis of one or more data attributes corresponding to the set of data points. The second analysis is defined by, among other things, the parameters (i.e., the data fields) of the first relevant follow-up query. At block 1050, a final data story based on at least the primary result and the secondary result is provided for output. The final data story is generated by choosing an aggregation method configured to integrate one or more NLG templates in accordance with at least the primary result and the secondary result.

Figure 11:
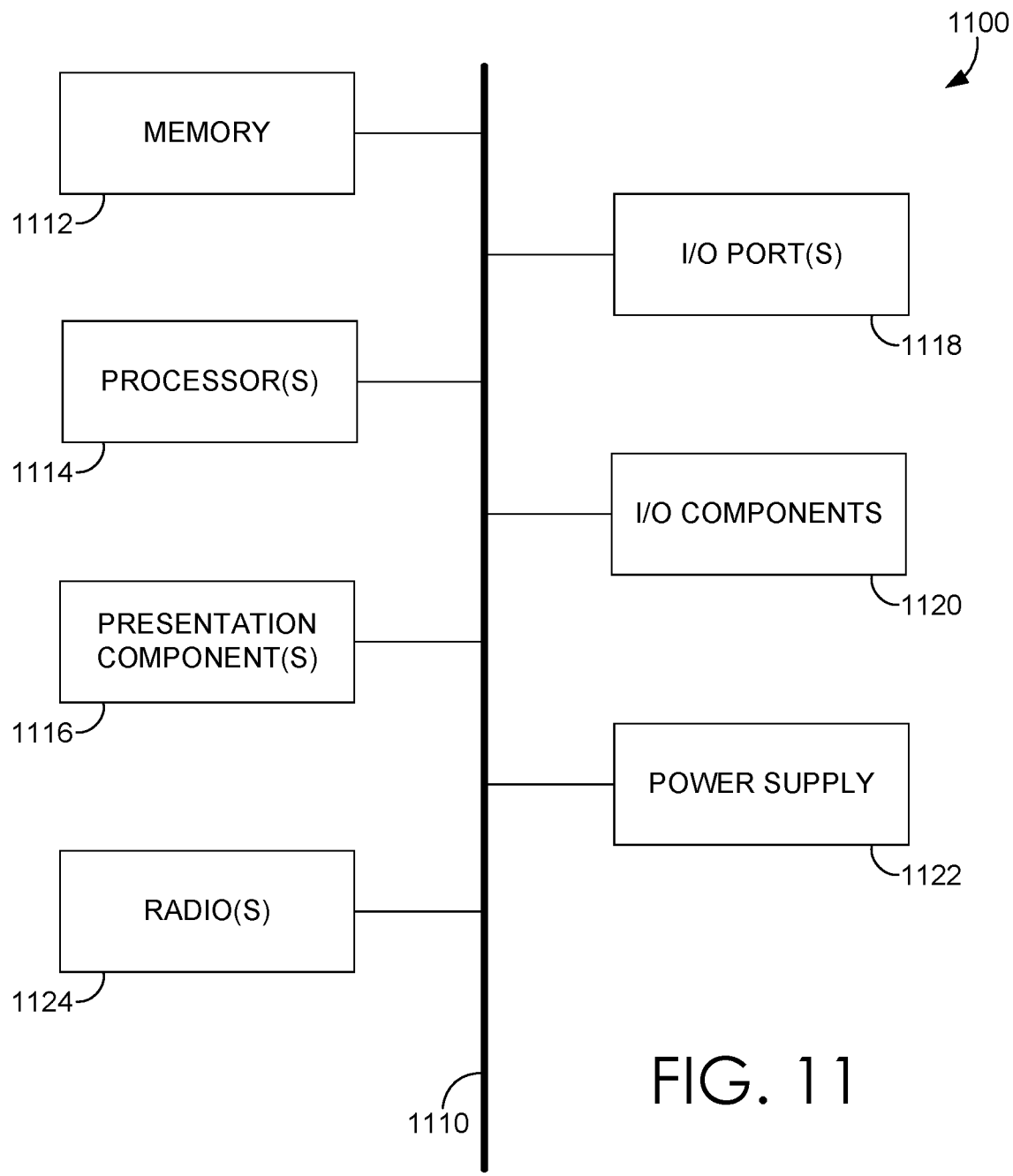
FIG. 11 is a block diagram of an exemplary computing environment suitable for use in implementations of the present disclosure.

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component.

Also, processors have memory. The inventors recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As described above, implementations of the present disclosure provide for facilitating data analytics in a bilateral Q&A format. While it is contemplated that the present disclosure can facilitate the augmentation and/or summarization of an information processing task, such as statistical analytics, it is further contemplated the features described herein can also facilitate the augmentation and/or summarization of an information retrieval task, such as when performing searches on textual, image, or multimedia data. For instance, media data (i.e., text, images, videos) in a collection can be individually associated with tags and/or captions, either associated directly with each file or associated indirectly with each file, such as being pulled from an external corpus (i.e., a blog or website) in the form of a caption or image description. Employing embodiments described herein, a narrative describing a sequence of images in a set of images can be generated and provided for output to a user in the form of a final data story, by describing a sequence of events or summarizing information associated with each media file in a natural language embellishment. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for interactively executing an information processing task, the method comprising:
    receiving, by a computing device, a first natural-language query input that includes at least one user-provided data attribute, wherein a corresponding set of data points for each at least one user-provided data attribute is processed responsive to the receipt of the first natural-language query input;
    generating, by the computing device, a primary result for the received first natural-language query input based at least in part on a plurality of defined data attributes associated with each processed corresponding set of data points;
    ranking, by the computing device, each defined data attribute of the associated plurality of defined data attributes based on a determined relevance of the defined data attribute to the generated primary result;
    generating at least one selectable natural-language follow-up query relevant to the first natural-language query, the at least one selectable natural-language follow-up query being generated based at least in part on a highest ranked defined data attribute from the ranked associated plurality of defined data attributes;

providing for output, by the computing device, a natural-language summary of the generated primary result in response to the first natural-language query in conjunction with the at least one selectable natural-language follow-up query relevant to the first natural-language query; and initiating an analysis directed to a second plurality of defined data attributes associated with a natural-language follow-up query selected from the at least one selectable natural-language follow-up query.

2. The method of claim 1, wherein the natural-language summary and the at least one relevant natural-language follow-up query are each generated by a natural language embellishment module.

3. The method of claim 2, wherein the natural language embellishment module is configured to select, from a natural language generation template library comprising a plurality of embellishment templates, at least one relevant natural language generation template, to generate a narrative based on at least one of the generated primary result and at least one defined data attribute.

4. The method of claim 1, wherein the primary result is generated based further in part on a removal of at least one data point from the processed corresponding set of data points, the removal being based on stored user profile information.

5. The method of claim 1, wherein the primary result is generated based further in part on a compared distribution of data points from each corresponding set of data points.

6. The method of claim 1, wherein the primary result is generated based further in part on a pointwise comparison performed between at least one trend determined for each corresponding set of data points and a defined benchmark average distribution.

7. The method of claim 1, further providing for output at least one visual representation for each corresponding set of data points.

8. The method of claim 7, wherein the at least one visual representation includes at least a representation of a significant distribution and a representation of a tail distribution.

9. The method of claim 7, wherein the at least one visual representation is categorized by at least one of a regional view, a temporal view, a product view, a subscription type view, and a market view.

10. The method of claim 1, wherein the relevance of the defined data attribute is determined based on an ensemble tree learning methodology.

11. The method of claim 10, wherein the ensemble tree learning methodology includes a ranking of each defined data attribute that is determined based on a random forest attribute importance calculation.

12. The method of claim 1, further comprising:
receiving the selection of the natural-language follow-up query from the at least one selectable natural-language follow-up query; and
based on the analysis directed to the second plurality of defined data attributes associated with the selected natural-language follow-up query, generating, by the computing device, a secondary result the selected relevant natural-language follow-up query, wherein the secondary result relates to the second plurality of defined data attributes associated with the selected natural-language follow-up query, wherein the second plurality of defined data attributes differ from the plurality of defined data attributes.

13. The method of claim 12, further comprising:
generating, by the computing device, a final data story based on an integration of at least one embellishment template that is selected based on at least a portion of the primary result and at least a portion of the secondary result, wherein the generated final data story is provided for output.

14. The method of claim 1, wherein the associated plurality of defined data attributes is ranked in response to the primary result being generated.

15. The method of claim 14, wherein the relevant natural-language follow-up query is generated in response to the associated plurality of defined data attributes being ranked.

16. A non-transitory computer storage medium storing computer-useable instructions that, when used by at least one computing device, cause the at least one computing device to perform operations comprising:
receiving an initial natural language query including at least one user-provided data attribute to generate a primary result, wherein the primary result is generated based on one or more sets of data points that are each determined to correspond to the at least one user-provided data attribute included in the received initial natural language query;
generating at least one follow-up query that is determined relevant to the generated primary result based on a ranking of defined data attributes associated with the one or more sets of data points, the defined data attributes being ranked based on a random forest attribute importance;
converting each of the generated primary result and the generated at least one follow-up query into an audible and/or textual narrative that is generated based on one or more selected natural language embellishment templates, each generated at least one follow-up query corresponding to at least one of the ranked data attributes; initiating an analysis directed to a second plurality of defined data attributes associated with a first follow-up query selected from the generated at least one follow-up query; and
generating, responsive to a received response determined to correspond to the selected first follow-up query, a secondary result based on at least one of the ranked data attributes corresponding to the generated first follow-up query.

17. The medium of claim 16, wherein each of the one or more selected natural language embellishment templates are employable to generate at least one natural language narrative.

18. The medium of claim 16, wherein the relevant at least one follow-up query is generated in response to the defined data attributes being ranked.

19. A computerized system comprising:
at least one processors; and
at least one computer storage media storing computer-usable instructions that, when used by the at least one processor, causes the at least one processor to:
receive a first natural language query that references a set of data points and at least one user-provided data attribute to initiate an analysis of the referenced set of data points based on the at least one user-provided data attribute;
generate, based on the initiated analysis, a primary result that is based on the referenced set of data points and the at least one user-provided data attribute, wherein a plurality of defined data attributes is determined to correspond to the primary result based on the analysis, wherein the plurality of defined data attributes include statistical dimensions;

rank the plurality of defined data attributes corresponding to the primary result based on a determined relevance of each defined data attribute to the primary result;

generate at least one natural-language representation of at least one follow-up query relevant to the first natural-language query based at least in part on a highest ranked defined data attribute from the ranked plurality of defined data attributes;

provide for output a generated natural-language summary of the primary result in response to the first natural-language query in conjunction with the generated natural-language representation of the at least one follow-up query relevant to the first natural-language query;

generate, based on a received input, a secondary result that corresponds to a first relevant follow-up query of the generated at least one relevant follow-up query, wherein the secondary result is generated based at least in part on the referenced set of data points and the defined data attribute corresponding to the first relevant follow-up query; and provide for output a final data story that is generated based on at least a portion of the primary result and at least a portion of the secondary result, wherein at least one natural language generation (NLG) template is employed to convert at least the portion of the primary result and at least the portion of the secondary result into the final data story.

20. The computerized system of claim 19, wherein the natural-language representation of the at least one relevant follow-up query is generated in response to the associated plurality of defined data attributes being ranked.

* * * * *

UNITED STATES PATENT AND TRADEMARK OFFICE
CERTIFICATE OF CORRECTION

PATENT NO. : 10,909,111 B2
APPLICATION NO. : 14/971180
DATED : February 2, 2021
INVENTOR(S) : Walter W. Chang et al.

Page 1 of 1

It is certified that error appears in the above-identified patent and that said Letters Patent is hereby corrected as shown below:

In the Claims

In Column 25, Line 61, Claim 12, after "result" insert -- for --.

In Column 25, Lines 61-62, Claim 12, before "natural-language" delete "relevant".

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*